US011435097B2

(12) United States Patent
Kim et al.

(10) Patent No.: US 11,435,097 B2
(45) Date of Patent: Sep. 6, 2022

(54) AIR CLEANING MODULE

(71) Applicant: SEOUL VIOSYS CO., LTD., Gyeonggi-do (KR)

(72) Inventors: Ji-Won Kim, Gyeonggi-do (KR); Jae-Hak Jeong, Gyeonggi-do (KR); Sang-Chul Shin, Gyeonggi-do (KR)

(73) Assignee: SEOUL VIOSYS CO., LTD., Gyeonggi-Do (KR)

( * ) Notice: Subject to any disclaimer, the term of this patent is extended or adjusted under 35 U.S.C. 154(b) by 53 days.

(21) Appl. No.: 17/036,813

(22) Filed: Sep. 29, 2020

(65) Prior Publication Data

US 2021/0010695 A1 Jan. 14, 2021

Related U.S. Application Data

(63) Continuation of application No. 16/116,219, filed on Aug. 29, 2018, now Pat. No. 10,871,295.

(30) Foreign Application Priority Data

Aug. 30, 2017 (KR) .......................... 10-2017-0110498
Sep. 28, 2017 (KR) .......................... 10-2017-0125713

(51) Int. Cl.
*F26B 21/06* (2006.01)
*F24F 8/10* (2021.01)
(Continued)

(52) U.S. Cl.
CPC ............... *F24F 8/10* (2021.01); *B01D 46/04* (2013.01); *B01D 46/2403* (2013.01);
(Continued)

(58) Field of Classification Search
CPC .... F24F 8/10; F24F 13/20; F24F 13/28; F24F 11/89; F24F 3/16; B01D 46/04;
(Continued)

(56) References Cited

U.S. PATENT DOCUMENTS 5,925,320 A * 7/1999 Jones .................. A61L 2/10
 55/327
2004/0152412 A1* 8/2004 Gehring ............... B60H 1/3414
 454/153
(Continued)

FOREIGN PATENT DOCUMENTS

CN 105792859 7/2016
CN 106415139 2/2017
(Continued)

OTHER PUBLICATIONS

Office Action issued in Corresponding Chinese Application No. 201811003263.2, dated Feb. 2, 2021.
(Continued)

*Primary Examiner* — John P McCormack
(74) *Attorney, Agent, or Firm* — Burris Law,PLLC

(57) ABSTRACT

An air cleaning module includes a filter, a fan, a light source unit, a housing and a guide structure. The fan is configured to provide a suction direction and a blowing direction of a fluid which are substantially aligned. The light source unit is arranged to be adjacent to the filter to emit a light toward the filter. The light having a property that sterilizes a contaminant source in a fluid. The housing includes a fluid passage space. The guide structure is arranged between the fan and the filter and configured to guide a fluid to move along a fluid passage path set by the guide structure. The filter and the light source unit are arranged in the fluid passage space such that the light source unit sterilizes a fluid as a fluid flows toward the light source unit.

18 Claims, 36 Drawing Sheets

(51) Int. Cl.
  *F24F 13/28* (2006.01)
  *B01D 46/24* (2006.01)
  *F24F 13/20* (2006.01)
  *B01D 46/04* (2006.01)
  *B01D 46/10* (2006.01)
  *B01D 46/00* (2022.01)
  *B01D 46/71* (2022.01)

(52) U.S. Cl.
  CPC .............. *F24F 13/20* (2013.01); *F24F 13/28* (2013.01); *B01D 46/0028* (2013.01); *B01D 46/10* (2013.01); *B01D 46/71* (2022.01); *B01D 2273/30* (2013.01)

(58) Field of Classification Search
  CPC ............. B01D 46/2403; B01D 46/0028; B01D 46/10; B01D 46/71; B01D 2273/30; B01D 53/86; F04D 29/703
  USPC .......................................................... 34/82
  See application file for complete search history.

(56) References Cited

U.S. PATENT DOCUMENTS

| | | |
|---|---|---|
| 2014/0023824 A1 | 8/2014 | Jardine et al. |
| 2016/0263266 A1* | 9/2016 | Wesén ............... F24F 3/16 |
| 2018/0207311 A1* | 7/2018 | Cho ................ B01D 53/885 |
| 2019/0148596 A1* | 5/2019 | Park ................ H01L 33/38 257/99 |

FOREIGN PATENT DOCUMENTS

| | | |
|---|---|---|
| KR | 1020100119627 A | 11/2010 |
| KR | 1020150076586 A | 7/2015 |
| KR | 1020170038956 | 4/2017 |
| KR | 1020170055689 A | 5/2017 |
| WO | 2010098848 | 9/2010 |

OTHER PUBLICATIONS

Office Action issued in corresponding Korean Application 10-2017-0125713, dated Mar. 24, 2022, English translation, 5 pages.

* cited by examiner

AIR CLEANING MODULE

CROSS-REFERENCE TO RELATED APPLICATION AND PRIORITY

This application is a continuation of U.S. application Ser. No. 16/116,219 which claims priority from and the benefit of Korean Patent Application No. 10-2017-0110498, filed on Oct. 30, 2017, and Korean Patent Application No. 10-2017-0125713, filed on Sep. 28, 2017, which are hereby incorporated by reference for all purposes as if fully set forth herein.

BACKGROUND

Field

The present disclosure relates to an air cleaning module.

Discussion of the Background

In recent years, as pollution due to industrialization is getting worse, environmental concerns are increasing, and well-being is becoming an increasing trend. Accordingly, demands for clean air keep increasing, and particularly, related products for the clean air, such as a deodorization module, are being developed to provide clean indoor air.

The above information disclosed in this Background section is only for understanding of the background of the inventive concepts, and, therefore, it may contain information that does not constitute prior art.

SUMMARY

The present disclosure provides an air cleaning module having improved deodorizing efficiency.

In some embodiments, an air cleaning module includes a filter, a fan, a light source unit, a housing and a guide structure. The fan is configured to provide a suction direction and a blowing direction of a fluid which are substantially aligned. The light source unit is arranged to be adjacent to the filter to emit a light toward the filter. The light having a property that sterilizes a contaminant source in a fluid. The housing includes a fluid passage space and further includes a bottom, a ceiling facing the bottom, and a sidewall. The guide structure is arranged between the fan and the filter and configured to guide a fluid to move along a fluid passage path set by the guide structure. The guide structure separates a first space from a second space, the first space including the fluid passage path and the second space including no fluid passage path. The light source unit includes a substrate elongated in one direction and at least one light emitting device mounted on a front surface of the substrate to emit the light. The filter and the light source unit are arranged in the fluid passage space such that the light source unit sterilizes a fluid as a fluid flows toward the light source unit.

In some embodiments, the guide structure further includes a main guide provided between the fan and the light source unit. In other embodiments, the guide structure further includes a sub-guide provided behind the substrate of the light source unit.

In another embodiment, the air cleaning module further comprising a sensor provided on the inner space of the housing to sense a material in the fluid. The sensor is disposed in the second space.

In some embodiments, the filter is a photocatalytic filter, and the light source unit provides the light to the photocatalytic filter to react with the photocatalytic filter. In other embodiments, the air cleaning module of claim further includes a HEPA filter, and the light source unit provides a light at a sterilization wavelength to the HEPA filter.

In some embodiments, the housing further includes a light source fixing part protruded from inner surface of the housing to secure the light source unit. Additionally, or alternatively, the light source fixing part secures the light source unit to set a height of the light emitting device to correspond to a height of a center of the filter.

In some embodiments, a home appliance including the air cleaning module is provided. The housing of the home appliance includes the housing of the air cleaning module, instead of adopting a separate housing.

In some embodiments, an air cleaning module includes a filter, a fan, a light source unit, a housing, a guide unit and a sensor. The filter is configured to filter a fluid passing therehrough. The fan is configured to provide a suction direction and a blowing direction of a fluid. The suction direction and the blowing direction are substantially identical. The light source unit is provided between the fan and the filter to provide a light having a wavelength to sterilize a contaminant source in the fluid. The housing provides a fluid flow space, and the housing further includes a bottom, a ceiling facing the bottom, and a sidewall.

In some embodiments, the guide unit is configured to guide a fluid to move along one or more fluid flow paths set by the guide unit. The guide unit includes a main guide that separates a first space from a second space. The first space includes the fluid flow path formed and the second space including no fluid flow path. The sensor is provided on an inner space of the housing to sense a material in the fluid and disposed in the second space. The light source unit includes a substrate and at least one light emitting device mounted on a front surface of the substrate to emit the light. The at least one light emitting device includes a first conductive type semiconductor layer, an active layer and a second conductive type semiconductor layer. The active layer generates the light. The guide unit further includes a plurality sub-guides, and one or more fluid flow paths are guided to the light source via the plurality sub-guides.

In another embodiment, the housing further includes a light source fixing part protruded from an inner surface of the housing to secure the light source unit. The light source fixing part secures the light source unit to set a height of the light emitting device to correspond to a height of a center of the filter. In some embodiments, one or more fluid flow paths are divided while flowing along the plurality of sub-guides.

Embodiments of the inventive concept provide an air cleaning module including a filter, an air blower spaced apart from the filter to provide a fluid to the filter through a blowing port, a light source unit provided between the air blower and the filter to provide a light to the filter, and at least one guide provided between the air blower and the filter to guide a flow path through which the fluid flows. The guide guides a width of a passage of the fluid to become wider toward the filter.

The guide has a plate-like shape elongated to the filter from the light source unit.

At least a portion of the guide has a curved shape when viewed in a plan view.

The guide includes a pair of main guides provided at both sides of the blowing port to correspond to a width of the blowing port.

A width between the main guides in a direction vertical to a flow direction of the fluid increases from the air blower to the filter.

The air cleaning module further includes a first sub-guide provided between the main guides.

The air cleaning module further includes a housing providing a flow space for the fluid therein, and the housing includes a bottom, a ceiling facing the bottom, and a sidewall.

The guide is provided on at least one of the bottom and the ceiling.

One end of the guide is connected to the sidewall.

The ceiling includes an inlet connected to the air blower to suck the fluid, and the sidewall includes an outlet to exhaust the fluid.

The air blower allows the fluid to flow to the blowing port from the inlet, and a direction of the fluid passing through the inlet is different from a direction of the fluid passing through the blowing port. In this case, the air blower is disposed substantially parallel to the ceiling.

The air blower allows the fluid to flow to the blowing port from the inlet, and the direction of the fluid passing through the inlet is the same as the direction of the fluid passing through the blowing port. In this case, the air blower is disposed inclinedly to the ceiling.

The light source unit includes a substrate elongated in one direction and at least one light emitting device mounted on a front surface of the substrate to emit the light.

The housing further includes a supporter mounted on at least one of the bottom and the ceiling to fix the light source unit, and the supporter has a height at which a height of the light emitting device corresponds to a half of a height of the filter.

The substrate has a curved shape.

The substrate is disposed to make contact with the guide.

The guide further includes a second sub-guide provided behind the substrate.

The air blower is provided in two in number and includes a first air blower and a second blower. The guide is provided in plural number, and at least one of the guides has a straight shape.

The guide is provided at one side portion of the first air blower, the other side portion of the second air blower, and between the first and second air blowers.

The guide provided between the first and second air blowers has a straight shape when viewed in a plan view.

The filter faces the blowing port, and the flow path passes through the filter.

The flow path is provided between the filter and the light source unit.

The air cleaning module further includes a sensor provided in an area other than the flow path to sense a material in the fluid. The air cleaning module further includes a driver receiving sensing information from the sensor and controlling the air blower.

The filter is a photocatalytic filter, and the light source unit provides the light to the photocatalytic filter to react with the photocatalytic filter.

The filter is a HEPA filter, and the light source unit provides a light at a sterilization wavelength to the HEPA filter.

The air cleaning module further includes at least one filter disposed adjacent to the air blower to filter the fluid provided to the air blower. In this case, a sterilization light source is provided between the filter and the air blower or between the air blower and the filter.

According to the above, the air cleaning module may have improved deodorization efficiency.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
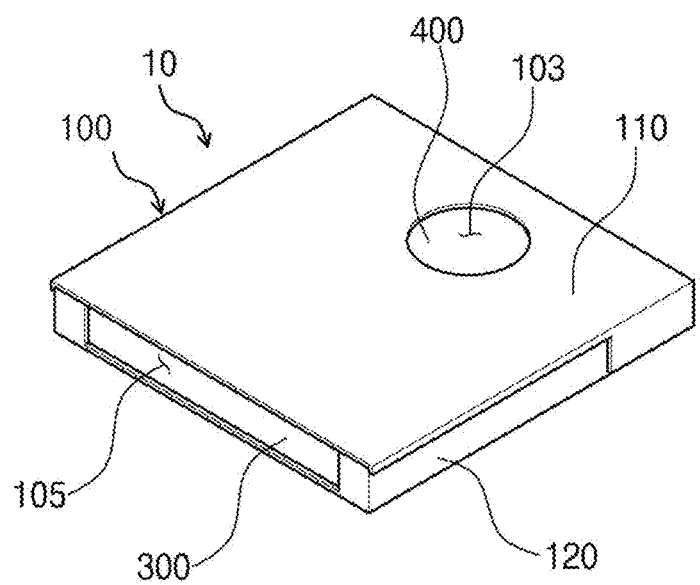
FIG. 1A is a perspective view showing an air cleaning module according to an exemplary embodiment of the present disclosure.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

An air cleaning module according to an exemplary embodiment of the present disclosure is applied to home appliances, such as a television set, a refrigerator, and a dehumidifier, or furniture, such as a closet and a kitchen sink cabinet. In the following exemplary embodiment of the present disclosure, the air cleaning module that deodorizes air will be mainly described, and further the air cleaning module according to an exemplary embodiment of the present disclosure may sterilize the air. The term "deodorization" used hereinafter should be interpreted to mean including sterilization and purification. In addition, the air cleaning module according to an exemplary embodiment of the present disclosure may be applied to other devices in addition to the home appliances or furniture. In the following descriptions, the air cleaning module applied to the television set to deodorize the air will be described as a representative example.

An air cleaning module according to an exemplary embodiment of the present disclosure includes a filter, a fan, a light source unit, a housing and a guide structure. The fan is configured to provide a suction direction and a blowing direction of a fluid which are substantially aligned. The light source unit is arranged to be adjacent to the filter to emit a light toward the filter. The light having a property that sterilizes a contaminant source in a fluid. The housing includes a fluid passage space. The guide structure is arranged between the fan and the filter and configured to guide a fluid to move along a fluid passage path set by the guide structure. The filter and the light source unit are arranged in the fluid passage space such that the light source unit sterilizes a fluid as a fluid flows toward the light source unit.

Hereinafter, exemplary embodiments of the present disclosure will be explained in detail with reference to the accompanying drawings.

Figure 1B:
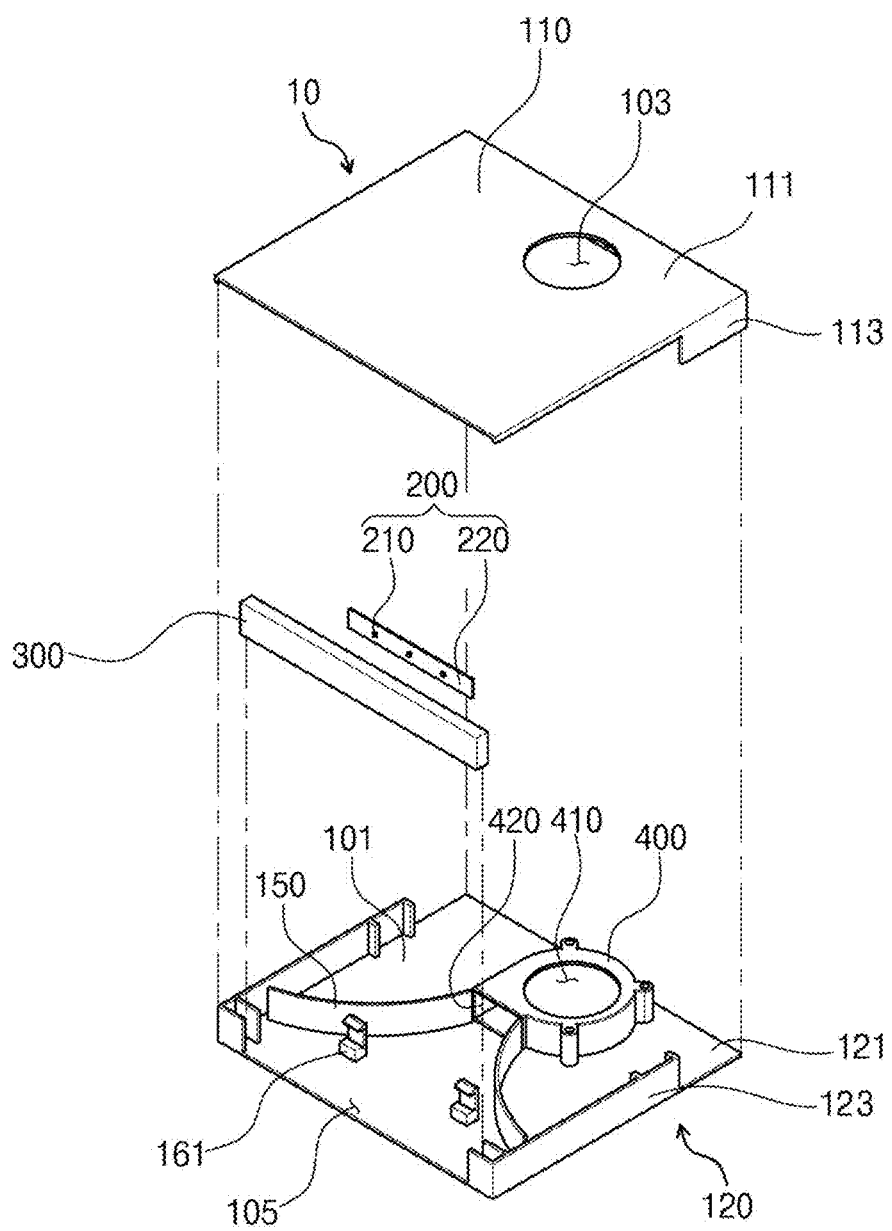
FIG. 1B is an exploded perspective view showing the air cleaning module shown in FIG. 1A according to an exemplary embodiment of the present disclosure.
Figure 1C:
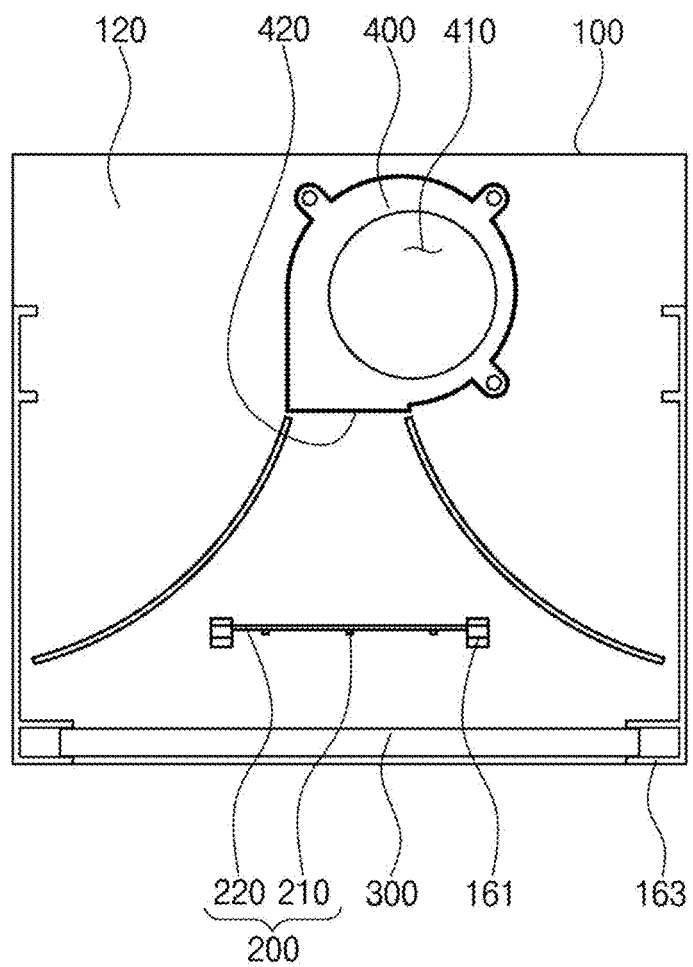
FIG. 1C is a plan view showing the air cleaning module shown in FIG. 1A according to an exemplary embodiment of the present disclosure.

FIG. 1A is a perspective view showing an air cleaning module 10 according to an exemplary embodiment of the present disclosure, FIG. 1B is an exploded perspective view showing the air cleaning module 10 shown in FIG. 1A according to an exemplary embodiment of the present disclosure, and FIG. 1C is a plan view showing the air cleaning module 10 shown in FIG. 1A according to an exemplary embodiment of the present disclosure.

Referring to FIGS. 1A to 1C, the air cleaning module 10 according to an exemplary embodiment of the present disclosure includes a housing 100 including an inner space 101 therein, a filter 300 disposed in the housing 100, a light source unit 200 providing a light to the filter 300, an air blower 400 intaking an external air and supplying the air to the filter 300, and a guide 150 disposed in the inner space 101 to guide an air flow direction to the filter 300 from the air blower 400. The housing 100 forms an exterior of the air cleaning module 10 to define the inner space 101 in which a fluid (e.g., air in the present exemplary embodiment) is treated.

Although the housing 100 forms the exterior of the air cleaning module 10, an additional case or parts may be further provided on the outside of the air cleaning module 10. In addition, the housing 100 may be provided as a separate component as shown in figures, but it should not be limited thereto or thereby. In a case where the air cleaning module 10 of the present disclosure is adopted in other home appliances or furniture, the air cleaning module 10 may be used as an internal part in components of other home appliances or furniture. For example, when the air cleaning module 10 is adopted in the home appliances such as the television set, a rear cover of the television set may be used as the housing 100 instead of adopting a separate housing.

The housing 100 may include an upper housing 110 and a lower housing 120, which are coupled to each other to form a cuboid shape in which the inner space 101 is defined. In the cuboid shape shown in figures, when assuming that a face facing upward and provided with an inlet formed therethrough is referred to as a "ceiling" 111, a face facing the ceiling 111 is referred to as a "bottom" 121, and faces disposed between the ceiling 111 and the bottom 121 are referred to as "sidewalls" 113 and 123, the upper housing 110 includes the ceiling 111 and at least a portion of the sidewall 113, and the lower housing 120 includes the bottom 121 and at least a portion of the sidewall 123. In the present exemplary embodiment, the sidewalls 113 and 123 may be formed by overlapping at least one of the upper housing 110 and the lower housing 120 or by overlapping both of the upper housing 110 and the lower housing 120. Accordingly, the term of "sidewall" means that the part is connected to at least one of the upper housing 110 and the lower housing 120.

The upper housing 110 and the lower housing 120 are coupled to each other by a hook or screw to provide the inner space 101 therein.

In the exemplary embodiment of the present disclosure, the housing 100 has a substantially rectangular shape, however, the shape of the housing 100 should not be limited to the rectangular shape, and the housing 100 may have various shapes unless departing from the present inventive concept. The shape of the housing 100 may be changed in various ways depending on a region of the home appliances or furniture, to which the air cleaning module 10 is adopted. In addition, in the exemplary embodiment of the present disclosure, the ceiling 111, the bottom 121, and the sidewalls 113 and 123 are used for the sake of descriptive convenience, and therefore, the ceiling 111 is not always provided on an upper side. The ceiling 111, the bottom 121, and the sidewalls 113 and 123 may be disposed to face other directions depending on the mounting position and mounting direction of the air cleaning module 10.

The housing 100 includes an inlet 103 formed through one side portion to suck the air and an outlet 105 formed through the other side portion to exhaust the air. A flow path through which the air introduced from the inlet 103 flows to the outlet 105 is formed in the inner space 101 of the housing 100. The inlet 103 and the outlet 105 are connected to an outside of the housing 100. The external air flows in the housing 100 through the inlet 103, and the air in the housing 100 flows out to the outside through the outlet 105. The air flowing through the inlet 103 and the outlet 105 is an object that requires the sterilization, purification, and deodorization. In the exemplary embodiment of the present disclosure, the object that requires the sterilization, purification, and deodorization may be changed.

In the exemplary embodiment of the present disclosure, the inlet 103 is defined through the ceiling 111, and the outlet 105 is defined in the sidewall, e.g., the sidewall 123 of the lower housing 120. Positions of the inlet 103 and the outlet 105 may be changed depending on positions of the light source unit 200, the photocatalytic filter 300, and the air blower 400.

The inlet 103 may have a circular or oval shape when viewed in a plan view, but it should not be limited thereto or thereby. In the exemplary embodiment of the present disclosure, the inlet 103 may have various shapes in cross-section, e.g., a polygonal shape like a quadrangular shape.

The inlet 103 may be connected to the inner space 101 in the housing 100. The outlet 105 may be provided at a position spaced apart from the inlet 103 and may be connected to the inner space 101 of the housing 100.

The outlet 105 may have a shape, e.g., a rectangular shape, corresponding to a shape of the sidewall 123. However, the shape of the outlet 105 should not be limited thereto or thereby. That is, the outlet 105 may have various shapes, such as a circular shape or an oval shape.

The air blower 400 is provided in the inner space 101 of the housing 100 and disposed adjacent to the inlet 103. The air blower 400 includes a suction port 410 to suck the air and a blowing port 420 to blow the air, and a fan is mounted in the air blower 400 to send the air sucked through the suction port 410 to the blowing port 420.

In the exemplary embodiment of the present disclosure, the air blower 400 may have a suction direction and a blowing direction of the air, which are equal to or different from each other depending on its structure or arranged direction, particularly depending on the position of the fan.

The suction port 410 and the blowing port 420 of the air blower 400 may be disposed to face different directions from each other. In the exemplary embodiment of the present disclosure, the suction port 410 may be opened to face the ceiling 111, and the blowing port 420 may be opened to face the outlet 105. In other words, the suction port 410 may be opened in a direction vertical to the bottom 121 with respect to a plane defined by the bottom 121, and the blowing port 420 may be opened in a direction substantially parallel to the bottom surface 121 with respect to the plane defined by the bottom 121. Accordingly, the air blower 400 changes a direction of airflow introduced from the inlet 103 to a direction to the outlet 105.

In the present exemplary embodiment, the suction port 410 of the air blower 400 may be disposed at a position corresponding to the inlet 103 of the housing 100, and the air blower 400 may be disposed parallel to the bottom 121.

The light source unit 200 is disposed in the housing 100 and emits a light. In the exemplary embodiment of the present disclosure, the light source unit 200 is disposed on the bottom 121.

The light source unit 200 is disposed spaced apart from the filter 300 and provides the light to the filter 300. In the present exemplary embodiment, the light source unit 200 may be provided to directly make contact with an upper surface of the bottom 121, but it should not be limited thereto or thereby. The light source unit 200 does not need to be in contact with the bottom 121 as long as the light source unit 200 is spaced apart from the filter 300 to provide the light to the filter 300. For instance, the light source unit 200 may be provided in connection with a light source fixing part 161 protruded from the bottom 121, the sidewalls 113 and 123, or the ceiling 111.

The light emitted from the light source unit 200 may have various wavelength bands. The light emitted from the light source unit 200 may have a visible light wavelength band, an ultraviolet light wavelength band, or other wavelength bands.

In the exemplary embodiment of the present disclosure, the wavelength band of the light emitted from the light source unit 200 may be changed depending on the type of the filter 300 described below.

The light source unit 200 may include at least one light emitting device 210 to emit the light. The light emitting device 210 may be mounted on a substrate 220.

In the exemplary embodiment of the present disclosure, the light source unit 200 may be provided in the form of a surface light source and/or a point light source. In the exemplary embodiment of the present disclosure, the light source unit 200 may be provided in the form of the point light source, and in the exemplary embodiment of the present disclosure, the light source unit 200 is provided in the form of the point light source.

The substrate 220 may have a plate-like shape. The substrate 220 may have a shape elongated in one direction or various shapes, such as a circular shape, an oval shape, or a polygonal shape, on which the light source device 210 may be mounted.

At least one light source unit 210, for example, a plurality of light emitting devices 210, may be disposed on at least one surface of the substrate 220. In the case where the light emitting device 210 is provided in plural number, the light emitting devices 210 may be arranged in various ways. For instance, the light emitting devices 210 may be randomly arranged, arranged to have a specific shape, arranged in a straight line, or arranged in a zigzag line. In this case, the light emitting devices 210 may be arranged to allow the light to be uniformly irradiated to the filter 300 as wide as possible.

In the case where the light source unit 200 includes the plural light emitting devices 220, each of the light emitting devices 210 may emit the light in the same wavelength band or the light in different wavelength bands. For example, in an exemplary embodiment, each of the light emitting devices 210 may emit the light in the ultraviolet light wavelength band. According to another exemplary embodiment, some light emitting devices 220 may emit the light corresponding to a portion of the ultraviolet light wavelength band, and the other light emitting devices 220 may emit the light corresponding to the other portion of the ultraviolet light wavelength band. As an example, some light emitting devices 220 may emit the light in the wavelength band from about 320 nm to about 400 nm, and the other light emitting devices 210 may emit the light in other wavelength bands different from the wavelength band from about 320 nm to about 400 nm. When the lights emitted from the light emitting devices 220 have different wavelength bands from each other, the light emitting devices 220 may be arranged in various shapes and orders.

However, the wavelength band of the light emitted from the light emitting device 210 should not be limited to the above-mentioned range. According to other embodiments, the light emitting device 210 may emit not only the light in the ultraviolet light wavelength band, but also the light in the visible light wavelength band.

In the exemplary embodiment of the present disclosure, the light source unit 200 may provide the light to a direction in which the filter 300 is provided. As shown in figures, when the light emitting devices 220 are disposed on the one surface of the substrate 220, the light is mainly emitted in a direction vertical to the surface on which the light emitting devices 220 are disposed. However, the emission direction of the light from the light source unit 200 may be changed in various ways.

The filter 300 is mounted in the inner space 101 of the housing 100 and disposed adjacent to the outlet 105.

Various types of filters may be used as the filter 300 to purify the air. In the exemplary embodiment of the present disclosure, the filter 300 may be a photocatalytic filter or a HEPA filter.

In the exemplary embodiment of the present disclosure, the filter 300 may be manufactured in a cuboid shape with relatively wide front and rear surfaces. The filter 300 may be elongated in one direction, and thus the filter 300 may have a size corresponding to a size of the outlet 105. The outlet 105 is covered by the filter 300.

The filter 300 may include protrusions formed thereon or thru-holes defined therethrough such that a contact area between the filter 300 and the air increases. The filter 300 according to the present exemplary embodiment may include a plurality of thru-holes defined through the front and rear surfaces, and the air may move through the thru-holes.

A filter fixing part 163 may be provided on the bottom 121, the sidewalls 113 and 123, and/or the ceiling 111 of the housing 100 to mount the filter 300 in the inner space 101 of the housing 100. For instance, an insertion recess or a protrusion may be provided on the sidewall of the lower housing 120 to allow the filter 300 to be slide-coupled to the housing 100. Accordingly, the filter 300 may be separately manufactured to insert into the housing 100 or to withdraw from the housing 100, and the filter 300 may be easily replaced as needed.

The filter 300 is spaced apart from the light source unit 200 to face the direction in which the air flows. The filter 300 faces the blowing port 420 of the air blower 400, and thus the air exiting from the blowing port 420 flows out to the outside through the outlet 105 after passing through the filter 300.

In the exemplary embodiment of the present disclosure, in the case where the photocatalytic filter is used as the filter 300, the filter 300 includes a photocatalyst that reacts with the light emitted from the light source unit 200 for treating the air. The photocatalyst is a material that causes the catalytic reaction.

The photocatalyst may react with lights in various wavelength bands depending on the material included in the photocatalyst. In the exemplary embodiment of the present disclosure, a material that causes the photocatalytic reaction with the light in the ultraviolet light wavelength band among various wavelength bands may be used, and this will be described hereinafter. However, the type of the photocatalyst should not be limited thereto or thereby, and other photocatalysts having the same or similar mechanism with respect to the light emitted from the light emitting device 210 may be used.

In this case, the light source unit 200 emits a light at the wavelength band suitable for the photocatalyst reaction. That is, the light source unit 200 may emit only a portion of the wavelength band in accordance with the material for the photocatalyst. For example, the light source unit 200 may emit the light in the ultraviolet light wavelength band. In this case, the light source unit 200 may emit the light in the wavelength band from about 100 nm to about 420 nm, and particularly, may emit the light in the wavelength band from about 240 nm to about 400 nm. In the exemplary embodiment of the present disclosure, the light source unit 200 may emit the light in the wavelength from about 250 nm to about 285 nm and/or the wavelength from about 350 nm to about 280 nm. In the exemplary embodiment of the present disclosure, the light source unit 200 may emit the light in the wavelength from about 275 nm to about 365 nm. The light emitting device 210 should not be particularly limited as long as the light emitting device 210 emits the light in the wavelength band that reacts with the photocatalytic material included in the filter 300. As an example, in the case where the light source unit 200 emits the light in the ultraviolet light wavelength band, various light emitting diodes emitting the ultraviolet light may be used.

The photocatalyst is activated by the ultraviolet light to cause a chemical reaction and decomposes various contaminants and germs in the air in contact with the photocatalyst through an oxidation-reduction reaction.

The photocatalyst causes the chemical reaction in which electrons and holes are generated when being exposed to a light above a band gap energy. Therefore, compounds in the air, e.g., water or organic material, may be decomposed by a hydroxyl radical and a superoxide ion, which are formed by the photocatalytic reaction. The hydroxyl radical is very strong oxidant and decomposes organic contaminants in the air and organic contaminants adsorbed in the filter, thereby producing a deodorizing effect. In addition, the hydroxyl radical inactivates the contaminants in the air to sterilize a contaminant source such as germs.

As the photocatalytic material, titanium dioxide ($TiO_2$), zinc oxide (ZnO), and tin dioxide ($SnO_2$) may be used. In the exemplary embodiment of the present disclosure, since a recombination speed of the electrons and the holes, which are generated on a surface of the photocatalyst, is very fast, the use of the electrons and holes in a photochemical reaction has its limit. Accordingly, a metal material, such as Pt, Ni, Mn, Ag, W, Cr, Mo, and Zn, or an oxidant thereof is added to the photocatalyst to delay the recombination speed of the electrons and holes. When the recombination speed of the electrons and holes is delayed, a contact probability with target substances and the radicals, which are to be oxidized and/or decomposed, increases, and as a result, a photocatalytic reactivity may increase. In addition, the band gap of the photocatalyst may be controlled with the addition of the oxidant to improve performance of the photocatalyst. With the above-described photocatalytic reaction, the air may be sterilized, purified, and deodorized. In the case of sterilization, enzymes in germ cells and enzymes that act on a respiratory system are destroyed to obtain sterilization or antimicrobial effect, and thus reproduction of germs or mold may be prevented and toxins released from the germs or mold may be also be degraded.

Particularly, in the exemplary embodiment of the present disclosure, the titanium oxide ($TiO_2$) may be used as the photocatalyst. The titanium oxide ($TiO_2$) irradiated with the ultraviolet light equal to or smaller than about 400 nm produces a superoxide radical, and the generated superoxide radical decomposes the organic material into harmless water and carbon dioxide. The titanium oxide may be nano-particled to produce a large amount of superoxide radical even though the light emitting device 210 that emits a relatively weak ultraviolet wavelength is used. Accordingly, the photocatalyst has superior organic decomposition capacity, continuous durability and stability regardless of environmental changes, and semi-permanent effect. In addition, the superoxide radical generated in large quantities may remove not only the organic material, but also various substances, such as odor and germs.

In the exemplary embodiment of the present disclosure, since the photocatalyst serves as only a catalyst and is not changed by itself, the photocatalyst may be semi-permanently used, and the effect caused by the photocatalyst may last semi-permanently as long as the corresponding light is provided to the photocatalyst.

In the exemplary embodiment of the present disclosure, in the case where the HEPA filter is used as the filter 300, the light emitted from the light source unit 200 may correspond to the sterilization wavelength band in which the HEPA filter is sterilized.

In the exemplary embodiment of the present disclosure, the HEPA filter may filter out more than 99.7% of organic and inorganic particles equal to or smaller than about 0.3 micrometers. Various materials are accumulated in the HEPA filter while the HEPA filter filters out particles in the air, and thus germs and mold may grow. The light source unit 200 may provide the light in the sterilization wavelength band, e.g., a light in an ultraviolet C wavelength band, to the HEPA filter to sterilize the HEPA filter.

The guide 150 is provided between the blowing port 420 and the filter 300.

The guide 150 guides the airflow direction to the filter 300 from the air blower 400. The guide 150 controls the airflow directivity such that the air efficiently flows to the filter 300 from the blowing port 420 as much as possible The guide 150 has a plate shape elongated from the light source unit 200 to the filter 300. In the elongated direction of the guide 150, one end of the guide 150 is connected to or disposed adjacent to the blowing port 420, and the other end of the guide 150 is connected to or disposed adjacent to one outermost end of the filter 300. The guide 150 may have a length that is adjustable within a range in which the directivity is controlled. In the present exemplary embodiment, a width direction of the guide 150 may be a direction substantially perpendicular to the plane surface defined by the bottom 121.

A longitudinal direction in which the guide 150 is elongated corresponds to a direction toward the filter 300 from the blowing port 420. When viewed in a plan view, the guide 150 may be elongated to the one outermost end of the filter 300 from one side portion of the blowing port 420 or may be elongated to the other outermost end of the filter 300 from the other side portion of the blowing port 420.

The air flows along a passage from the one side portion of the blowing port 420 to the surface of the filter 300. The guide 150 prevents the air from flowing to a side or opposite direction rather than a direction toward the filter 300 with respect to the blowing port 420. In a case where the guide 150 is not provided, a perimeter of blowing port 420 is entirely opened without any other structure, and thus, problems, such as a vortex occurrence in the air flowed out from the blowing port 420, an unstable airflow, or an excessively reduced flow rate of the air in some regions, may occur. As a result, all the air flowed out from the blowing port 420 may not reach the filter 300, and further the flow rate of the air reaching the filter 300 is not uniform, thereby degrading the air purification efficiency. On the contrary, according to the exemplary embodiment of the present disclosure, since the guide 150 is provided between the air blower 400 and the filter 300, the flow rate of the air may be prevented from becoming unstable and degrading.

In the exemplary embodiment of the present disclosure, the guide 150 may be provided on both sides of the blowing port 420 and may be disposed such that a width of the passage through which a fluid flows becomes wide as a distance from the filter 300 decreases. That is, when viewed in a direction vertical to the airflow direction, a width between the guide 150 disposed adjacent to one side of the blowing port 420 and the guide 150 disposed adjacent to the other side of the blowing port 420 increases from the air blower 400 to the filter 300.

In the exemplary embodiment of the present disclosure, since the filter 300 may have an area larger than an area of the blowing port 420 and the width between the both guides 150 becomes wider as the distance from the filter 300 decreases to correspond to the filter 300, the air evenly reaches the entire area of the filter 300. In addition, an area of the passage becomes wider from the blowing port 420 to the filter 300 in the above-described structure, and thus the flow rate of the air decreases as the distance from the filter 300 decreases. When the flow rate of the air decreases, the air may react with the filter 300 for a long enough time.

The guide 150 may have a flat plate shape or a curved surface shape. That is, the guide 150 may have a straight shape or a curved shape when viewed in a plan view. In the case where the guide 150 has the curved shape, the vortex of the air provided to the filter 300 and a loss in pressure of the air may be minimized. In the present exemplary embodiment, the guide 150 having the curved shape is shown as a representative example.

In the exemplary embodiment, the guide 150 is disposed on the lower housing 120, but it should not be limited thereto or thereby. The guide 150 may be disposed on at least one of the upper housing 110 and the lower housing 120. In addition, the guide 150 may be integrally formed with the upper housing 110 and/or the lower housing 120.

In the air cleaning module 10 having the above structure, since the guide 150 is disposed between the blowing port 420 and the filter 300, the flow rate of the air provided to the filter 300 may be prevented from being unstable and from being reduced, and thus air treatment effect, e.g., deodorization effect, may be improved.

Figure 2A:
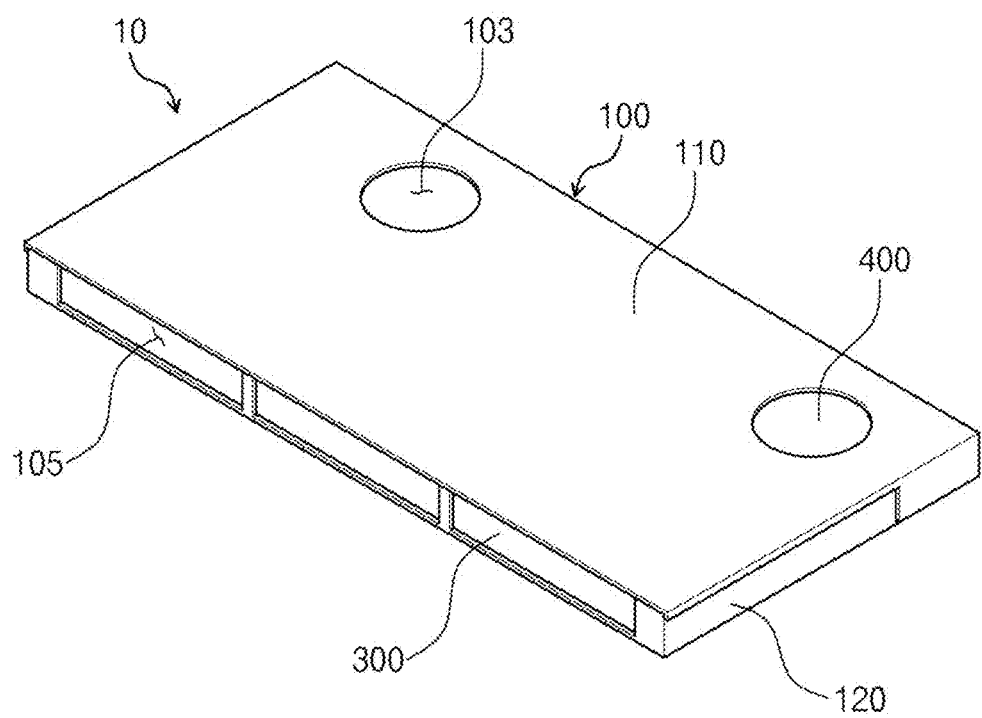
FIG. 2A is a perspective view showing an air cleaning module according to another exemplary embodiment of the present disclosure.
Figure 2B:
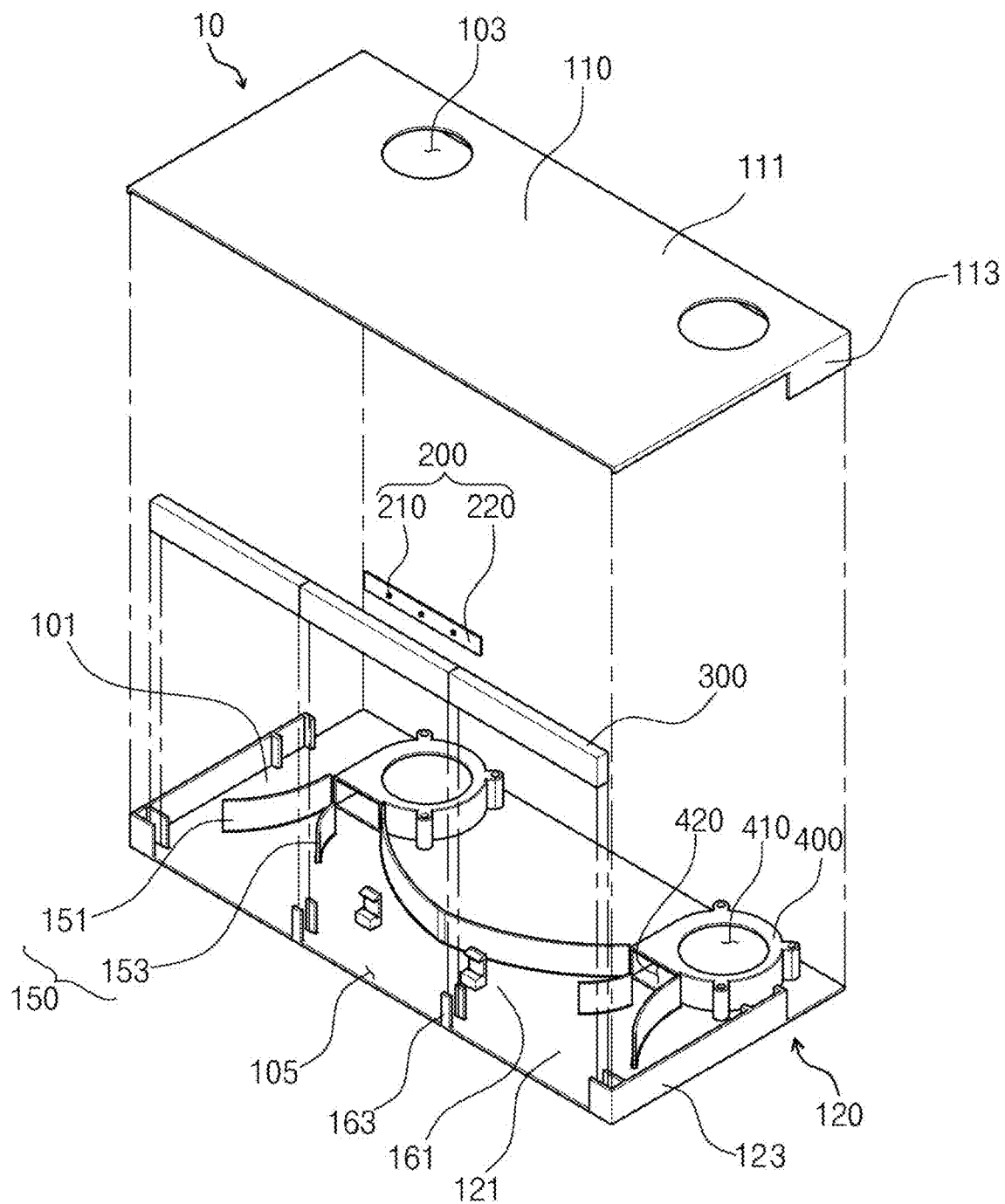
FIG. 2B is an exploded perspective view showing the air cleaning module shown in FIG. 2A according to an exemplary embodiment of the present disclosure.
Figure 2C:
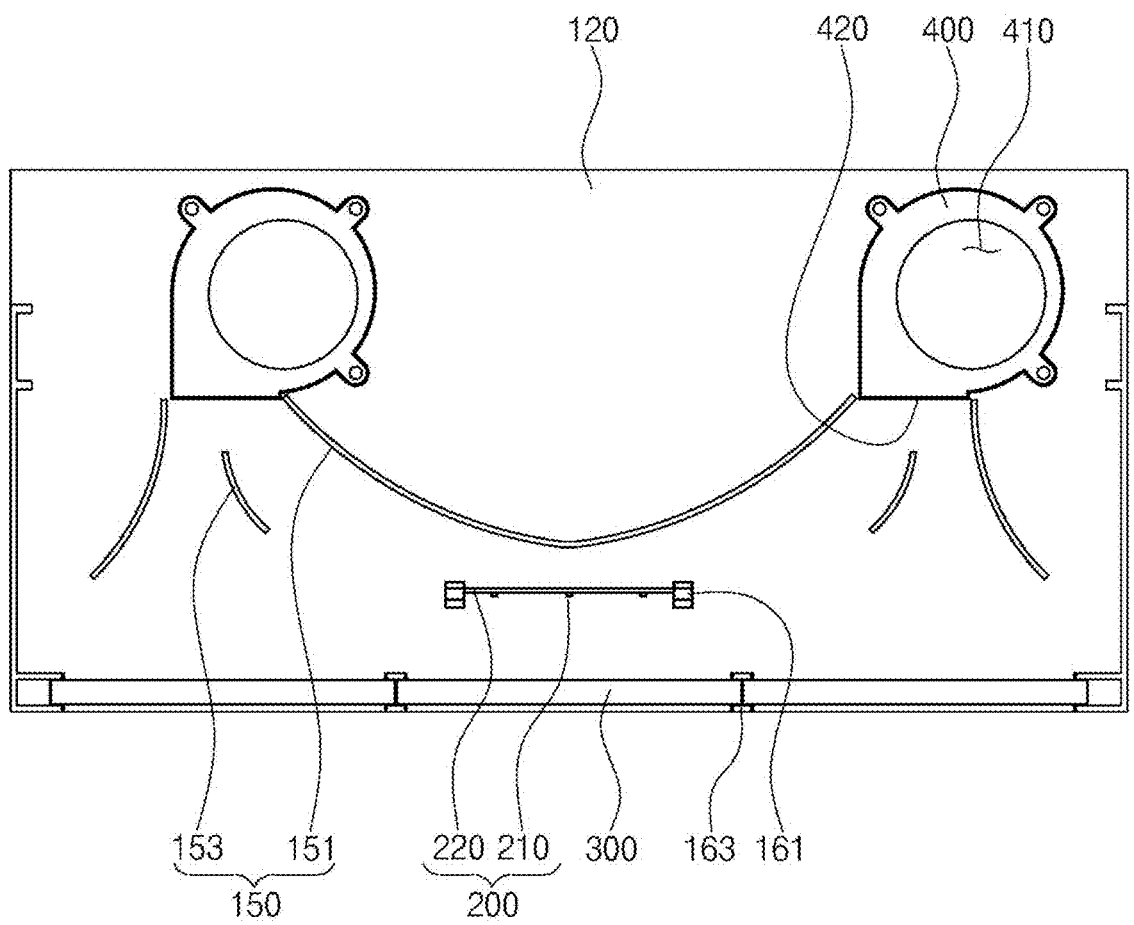
FIG. 2C is a plan view showing the air cleaning module shown in FIG. 2A according to an exemplary embodiment of the present disclosure.

The air cleaning module according to an exemplary embodiment of the present disclosure may be provided in various shapes. FIGS. 2A, 2B, and 2C are respectively a perspective view, an exploded perspective view, and a plan view showing an air cleaning module according to another exemplary embodiment of the present disclosure. In the following embodiments, different features from those of the above-described embodiments will be mainly described in order to avoid redundancy. Unexplained portions are similar to those of the above-described embodiments.

Referring to FIGS. 2A to 2C, the number of each of an air blower 400, a guide 150, a filter 300, and a light source unit 200 may be various.

In the present exemplary embodiment, the air blower 400 may be provided in singular or plural number. The number of the air blowers 400 may be two or more depending on an amount of air processed by a deodorization module 10 or a size or shape of an area in which the deodorization module 10 is mounted. In the present exemplary embodiment, two air blowers 400 will be described as a representative example, when two air blowers 400 are used, an inlet 103 is provided in a ceiling 111 at a position corresponding to the air blower 400 to provide the air to the air blower 400.

In the exemplary embodiment of the present disclosure, the number of the guides 150 may be two or more by taking into account a size of an inner space 101 of a housing 100, a size and number of a blowing ports 420, and the amount and speed of the flowing air. In addition, according to the exemplary embodiment of the present disclosure, an additional guide 150 may be further provided to prevent the airflow from being entangled. For example, the guide 150 may further include a first sub-guide 153 disposed on the flow path. For the convenience of explanation, when assuming that the guides 150 disposed at both sides of the blowing port 420 are main guides 151, the first sub-guide 153 may be disposed between two main guides 151. The first sub-guide 153 may be disposed parallel to the airflow direction and may have a length relatively shorter than the main guide 151. The first sub-guide 153 may be provided on the flow path in plural number.

In the exemplary embodiment of the present disclosure, the filter 300 may be provided by taking into account the shape of the housing 100 and the position of the light source unit 200 to receive as much light as possible from the light source unit 200.

Figure 3A:
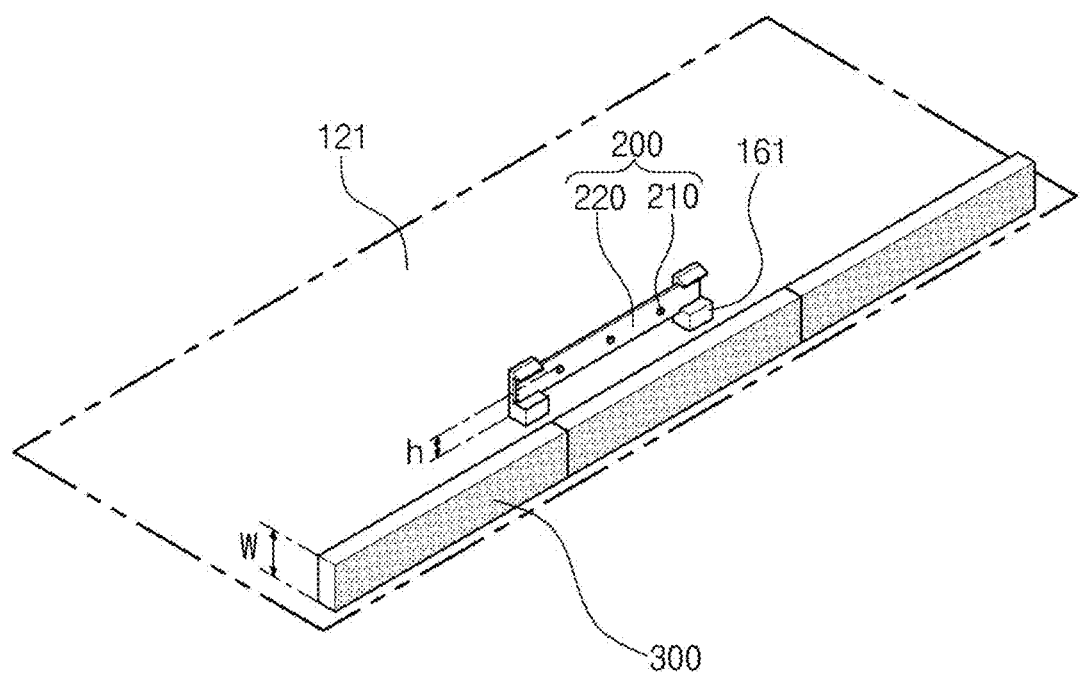
FIG. 3A is a perspective view showing a position of a light source unit and a filter according to an exemplary embodiment of the present disclosure.
Figure 3B:
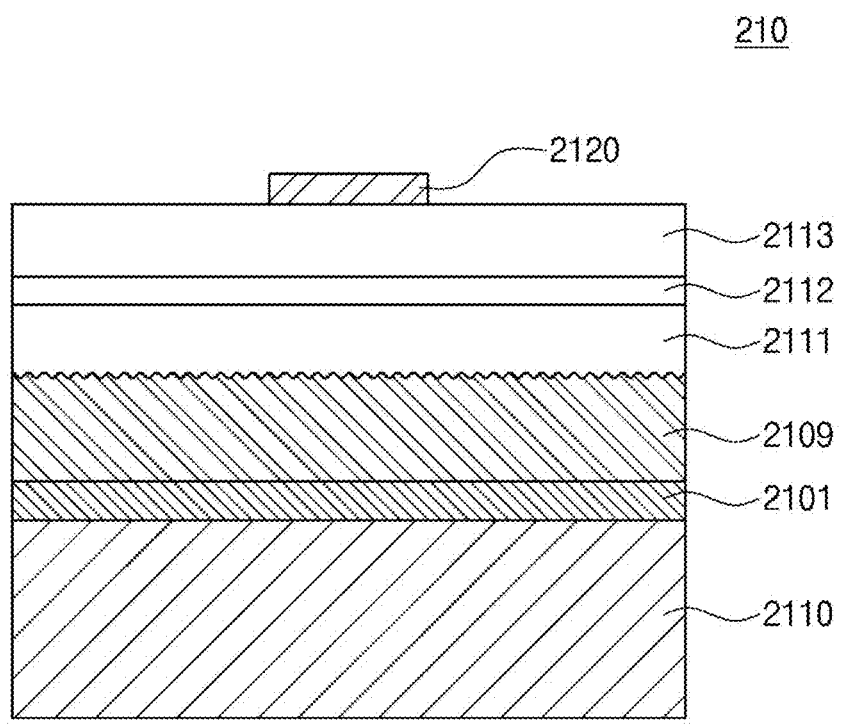
FIG. 3B is a cross-sectional view showing the light source unit shown in FIG. 3A including a vertical-type light emitting diode.
Figure 3C:
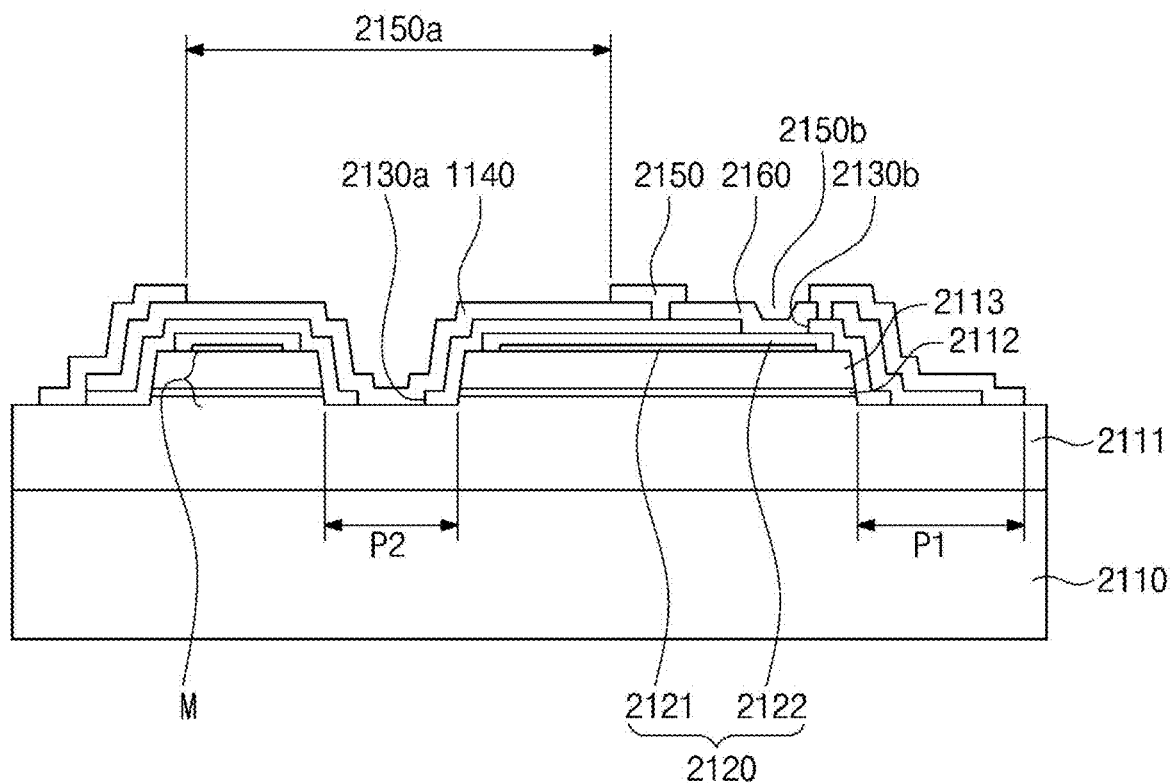
FIG. 3C is a cross-sectional view showing the light source unit shown in FIG. 3A including a flip-type light emitting diode.

FIG. 3A is a perspective view showing the position of the light source unit 200 and the filter according to an exemplary embodiment of the present disclosure, and FIGS. 3B and 3C are cross-sectional views showing the light source unit shown in FIG. 3A. Hereinafter, for the convenience of explanation, other components will be omitted.

Referring to FIG. 3A, the light source unit 200 is fixed to the bottom 121 by a light source fixing part 161. The light source fixing part 161 serves as a coupling member, such as a hook, and supports the light source unit 200. In the present exemplary embodiment, the hook is shown as the coupling member, however, the type of hook should not be limited thereto or thereby.

The light emitting device 210 of the light source unit 200 may have a height adjusted by a height of the light fixing part 161. In the exemplary embodiment of the present disclosure, a height of a center of the filter 300 may be the same as the height of the light emitting device 210 such that the light emitting device 210 of the light source unit 200 emits the light to the filter 300 as much as possible. For instance, as shown in FIG. 3, when assuming that the width of the filter, which corresponds to a height from the bottom 121 in figures, is assigned with "W" and the height of the light emitting device 210 of the light source unit 200 is assigned with "h", the "h" may correspond to about ½ of the "W".

In addition, since the light source fixing part 161 is provided, the light source unit 200 may be spaced apart from the bottom 121. In the case where the light source unit 200 is spaced apart from the bottom 121, the flow path is also formed between the light source unit 200 and the bottom 121, and thus the air may more easily flow to the filter 300.

The light source device 210 may be implemented in various shapes. FIGS. 3B and 3C show the light emitting device 210 implemented by the light emitting diode.

The light emitting diode may have various forms, e.g., a vertical-type light emitting diode or a flip-type light emitting diode. FIG. 3B shows the vertical-type light emitting diode, and FIG. 3C shows the flip-type light emitting diode. However, the form of the light emitting diode should not be limited thereto or thereby, and the following drawings are to be understood as one embodiment of the present disclosure.

Referring to FIG. 3B, the light emitting diode includes a first conductive type semiconductor layer 2111, an active layer 2112, and a second conductive type semiconductor layer 2113. A substrate 2100 that serves as a first electrode, an adhesive layer 2101, and a reflective layer 2109 are disposed under the first conductive type semiconductor layer 2111, and a second electrode 2120 is disposed on the second conductive type semiconductor layer 2113.

The substrate 2100 includes a conductive material, such as Si, GaAs, GaP, AlGaInP, Ge, SiSe, GaN, AlInGaN, or InGaN. The substrate 2100 also includes a single metal of Al, Zn, Ag, W, Ti, Ni, Au, Mo, Pt, Pd, Cu, Cr, Fe, or an alloy thereof.

The second conductive type semiconductor layer 2113 may be disposed on the first conductive type semiconductor layer 2111, and the active layer 2112 may be disposed between the first conductive type semiconductor layer 2111 and the second conductive type semiconductor layer 2113. The first conductive type semiconductor layer 2111, the active layer 2112, and the second conductive type semiconductor layer 2113 may include a III-V compound semiconductor, for example, a nitride-based semiconductor such as (Al, Ga, In)N. The first conductive type semiconductor layer 2111 may include a first conductive type impurity, e.g., Si, and the second conductive type semiconductor layer 2113 may include a second conductive type impurity, e.g., Mg, or vice versa.

In the exemplary embodiment of the present disclosure, the first conductive type semiconductor layer 2111 may be subjected to a roughening treatment. Accordingly, a light generated from the active layer 2112 may be reflected by the roughened surface.

In the exemplary embodiment of the present disclosure, the reflective layer 2109 may be interposed between the first conductive type semiconductor layer 2111 and the light source substrate 2110. The reflective layer 2109 may include a metal material with high reflectivity, e.g., silver (Ag) or aluminum (Al), and may include other metal materials with high reflectivity or alloys thereof.

Meanwhile, the adhesive layer 2101 may be interposed between the reflective layer 2109 and the light source substrate 2110, and the adhesive layer 2101 may increase an adhesive force between the reflective layer 2109 and the light source substrate 2110 to prevent the reflective layer 2109 and the light source substrate 2110 from being separated from each other. In addition, although not shown in figures, a diffusion prevention layer may be interposed between the adhesive layer 2101 and the reflective layer 2109. The diffusion prevention layer prevents metal elements from being diffused to the reflective layer 2109 from the adhesive layer 2101 or the light source substrate 2110 to maintain a reflectivity of the reflective layer 2109.

The second electrode 2120 is disposed on the second conductive type semiconductor layer 2113. Thus, a current may be supplied to the first conductive type semiconductor layer 2111 and the second conductive type semiconductor layer 2113 through the light source substrate 2110 serving as the first electrode and the second electrode 2120, and thus the light may be emitted.

Referring to FIG. 3C, the light emitting diode may include a mesa M including a first conductive type semiconductor layer 2111, an active layer 2112, and a second conductive type semiconductor layer 2113, a first insulating layer 2130a and 2130b, a first electrode 2140, and a second insulating layer 2150 and may further include a substrate 2100 and a second electrode 2120.

The substrate 2100 should not be particularly limited as long as the first conductive type semiconductor layer 2111, the active layer 2112, and the second conductive type semiconductor layer 2113 may be grown and may be a sapphire substrate 220, a silicon carbide substrate 220, a gallium nitride substrate 220, an aluminum nitride substrate 220, or a silicon substrate 220. The substrate 2100 may include an inclined side surface, and thus an extraction of the light generated from the active layer 2112 may be improved.

The second conductive type semiconductor layer 2113 may be disposed on the first conductive type semiconductor layer 2111, and the active layer 2112 may be disposed between the first conductive type semiconductor layer 2111 and the second conductive type semiconductor layer 2113. The first conductive type semiconductor layer 2111, the active layer 2112, and the second conductive type semiconductor layer 2113 may include a III-V compound semiconductor, for example, a nitride-based semiconductor such as (Al, Ga, In)N. The first conductive type semiconductor layer 2111 may include a first conductive type impurity, e.g., Si, and the second conductive type semiconductor layer 2113 may include a second conductive type impurity, e.g., Mg, or vice versa. The active layer 2112 may have a multiple quantum well structure (MQM). When a forward bias voltage is applied to the light emitting diode, electrons are combined with holes in the active layer 2112 to emit the light. The first conductive type semiconductor layer 2111, the active layer 2112, and the second conductive type semiconductor layer 2113 may be grown on the substrate 2100 using a metal-organic chemical vapor deposition (MOCVD) or a molecular-beam epitaxy (MBE).

The light emitting diode may include at least one mesa M including the active layer 2112 and the second conductive type semiconductor layer 2113. The mesa M may include a plurality of protrusions spaced apart from each other. As another way, the light emitting diode may include a plurality of mesas M spaced apart from each other. A side surface of the mesa M may be inclinedly formed by using a photoresist reflow process, and the inclined side surface of the mesa M may improve a light emitting efficiency of the light generated from the active layer 2112.

The first conductive type semiconductor layer 2111 includes a first contact region P1 and a second contact region P2 defined therein and exposed through the mesa M. Since the mesa M is formed by removing portions of the active layer 2112 and the second conductive type semiconductor layer 2113, which are disposed on the first conductive type semiconductor layer 2111, portions except for the mesa M become the contact regions that are the exposed upper surface of the first conductive type semiconductor layer 2111. The first electrode 2140 makes contact with the first contact region P1 and the second contact region P2, and thus the first electrode 2140 may be electrically connected to the first conductive type semiconductor layer 2111. The first contact region P1 may be disposed around the mesa M along an edge of the first conductive type semiconductor layer 2111, and in detail, the first contact region P1 may be disposed along the edge of the upper surface of the first conductive type semiconductor layer 2111 between the mesa M and the side surface of the light emitting diode. The second contact region P2 may be partially surrounded by the mesa M.

The second electrode 2120 may be disposed on the second conductive type semiconductor layer 2113 and electrically connected to the second conductive type semiconductor layer 2113. The second electrode 2120 may be formed on the mesa M and may have the same shape as that of the mesa M. The second electrode 2120 may include a reflective metal layer 2121 and a barrier metal layer 2122, and the barrier metal layer 2122 may cover an upper surface and a side surface of the reflective metal layer 2121. For instance, when a pattern of the reflective metal layer 2121 is formed and the barrier metal layer 2122 is formed on the pattern of the reflective metal layer 2121, the barrier metal layer 2122 may be formed to cover the upper surface and the side surface of the reflective metal layer 2121. As an example, the reflective metal layer 2121 may be formed by depositing and patterning Ag, Ag alloy, Ni/Ag, NiZn/Ag, TiO/Ag layer.

Meanwhile, the barrier metal layer 2122 may be formed of Ni, Cr, Ti, Pt, Au, or a composition layer thereof. In detail, the barrier metal layer 2122 may be the composition layer of Ni/Ag/[Ni/Ti]2/Au/Ti that are sequentially formed on the second conductive type semiconductor layer 2113. In more detail, at least a portion of the upper surface of the second electrode 2120 may include a Ti layer with a thickness of about 300 angstroms (Å). In a case where a portion, which makes contact with the first insulating layer 2130a and 2130b, of the upper surface of the second electrode 2120 includes the Ti layer, an adhesive force between the first insulating layer 2130a and 2130b and the second electrode 2120 may be improved, and thus a reliability of the light emitting diode may be improved.

An electrode protective layer 2160 may be disposed on the second electrode 2120, and the electrode protective layer 2160 may include the same material as the first electrode 2140, but it should not be limited thereto or thereby.

The first insulating layer 2130a and 2130b may be disposed between the first electrode 2140 and the mesa M. The first electrode 2140 may be insulated from the mesa M by the first insulating layer 2130a and 2130b, and the first electrode 2140 and the second electrode 2120 may be insulated from each other. The first insulating layer 2130a and 2130b may partially expose the first contact region P1 and the second contact region P2. In detail, the first insulating layer 2130a and 2130b may expose the portion of the second contact region P2 through an opening 2130a, and the first insulating layer 2130a and 2130b covers only a portion of the first contact region P1 between an edge of the first conductive type semiconductor layer 2111 and the mesa M, thereby exposing at least the portion of the first contact region P1.

The first insulating layer 2130a and 2130b may be disposed above the second contact region P2 along an edge of the second contact region P2. In this case, the first insulating layer 2130a and 2130b may be disposed more adjacent to the mesa M than an area in which the first contact region P1 makes contact with the first electrode 2140.

The first insulating layer 2130a and 2130b may include an opening 2130b defined therethrough to expose the second electrode 2120. The second electrode 2120 may be electrically connected to a pad or a bump through the opening 2130b.

Although not shown in figures, when viewed in a plan view, the area in which the first contact region P1 makes contact with the first electrode 240 is disposed along an edge of the upper surface of the first conductive type semiconductor layer 2111. In detail, the area in which the first contact region P1 makes contact with the first electrode 2140 may be disposed adjacent to four side surfaces of the first conductive type semiconductor layer 2111 and may completely surround the mesa M. In this case, since an area in which the first electrode 2140 makes contact with the first conductive type semiconductor layer 2111 increases, a current flowing to the first conductive type semiconductor layer 2111 from the first electrode 2140 may be effectively distributed, and thus the forward bias voltage may be more reduced.

In the exemplary embodiment of the present disclosure, the first electrode 2140 and the second electrode 2120 of the light emitting diode may be directly mounted on the substrate 220 or may be mounted on the substrate 220 using the pad.

For example, in the case where the light emitting diode is mounted on the substrate 220 using the pad, two pads may be provided between the light emitting diode and the substrate 220, and the two pads may make contact with the first electrode 2140 and the second electrode 2120, respectively. As an example, the pad may include a solder or an eutectic metal, but it should not be limited thereto or thereby. For instance, gold-tin (AuSn) may be used as the eutectic metal.

As another example, in the case where the light emitting diode is directly mounted on the substrate 220, the first electrode 2140 and the second electrode 2120 of the light emitting diode may be directly bonded to wirings on the substrate 220. In this case, a bonding material may include an adhesive material having a conductive property. For example, the bonding material may include at least one conductive material among silver (Ag), tin (Sn), and Copper (Cu). However, this is merely exemplary, and the bonding material may include various materials having the conductive property.

FIGS. 4A to 4F are plan views showing a guide 150 according to exemplary embodiments of the present disclosure.

Figure 4A:
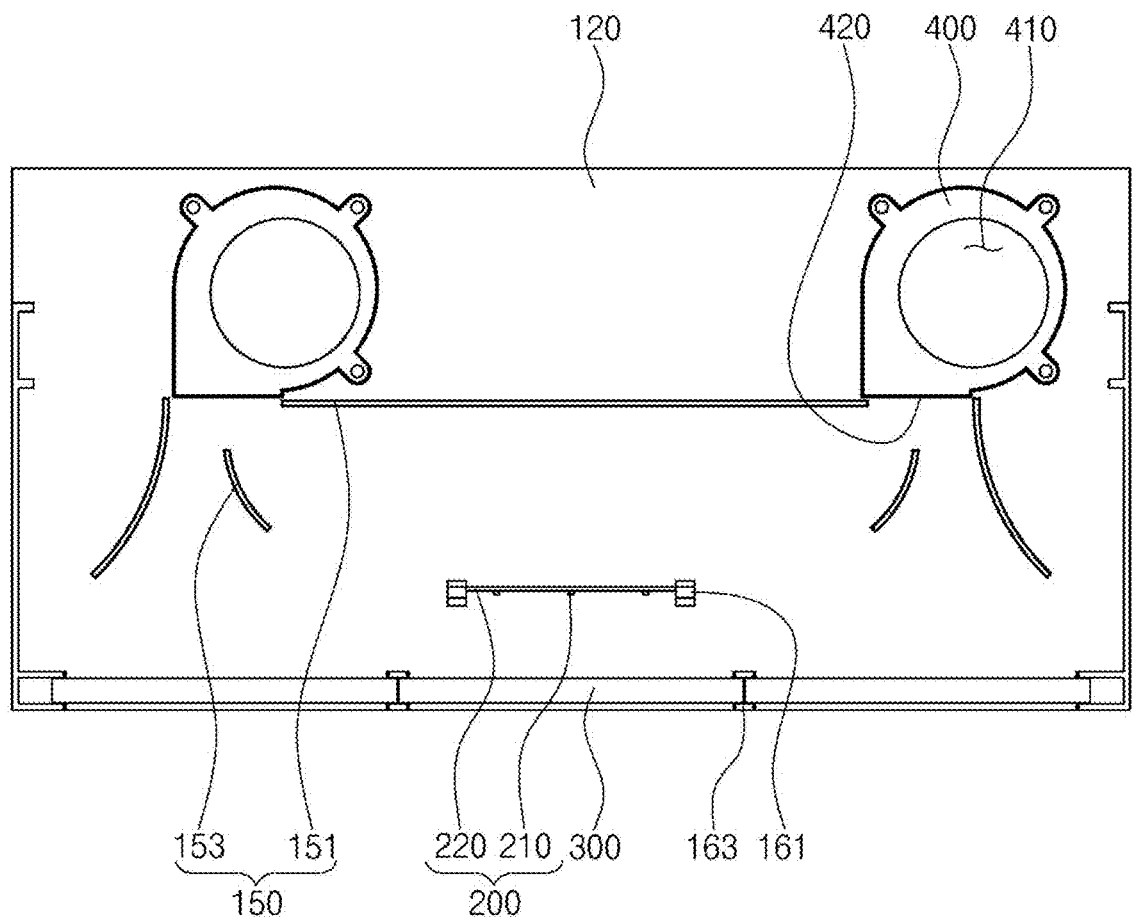
FIG. 4A is a plan view showing a guide having a straight shape and a curved shape according to exemplary embodiments of the present disclosure.

Referring to FIG. 4A, the guide 150 may have a shape obtained by combining the straight shape and the curved shape. In the present exemplary embodiment, two air blowers 400 are shown, and a main guide 151 has a straight shape in an area between the two air blowers 400 and has a curved shape in an area except for the area between the two air blowers 400. The main guide 151 disposed between the two air blowers 400 may prevent the air from the two air blowers 400 from flowing in an opposite direction to the filter 300.

Figure 4B:
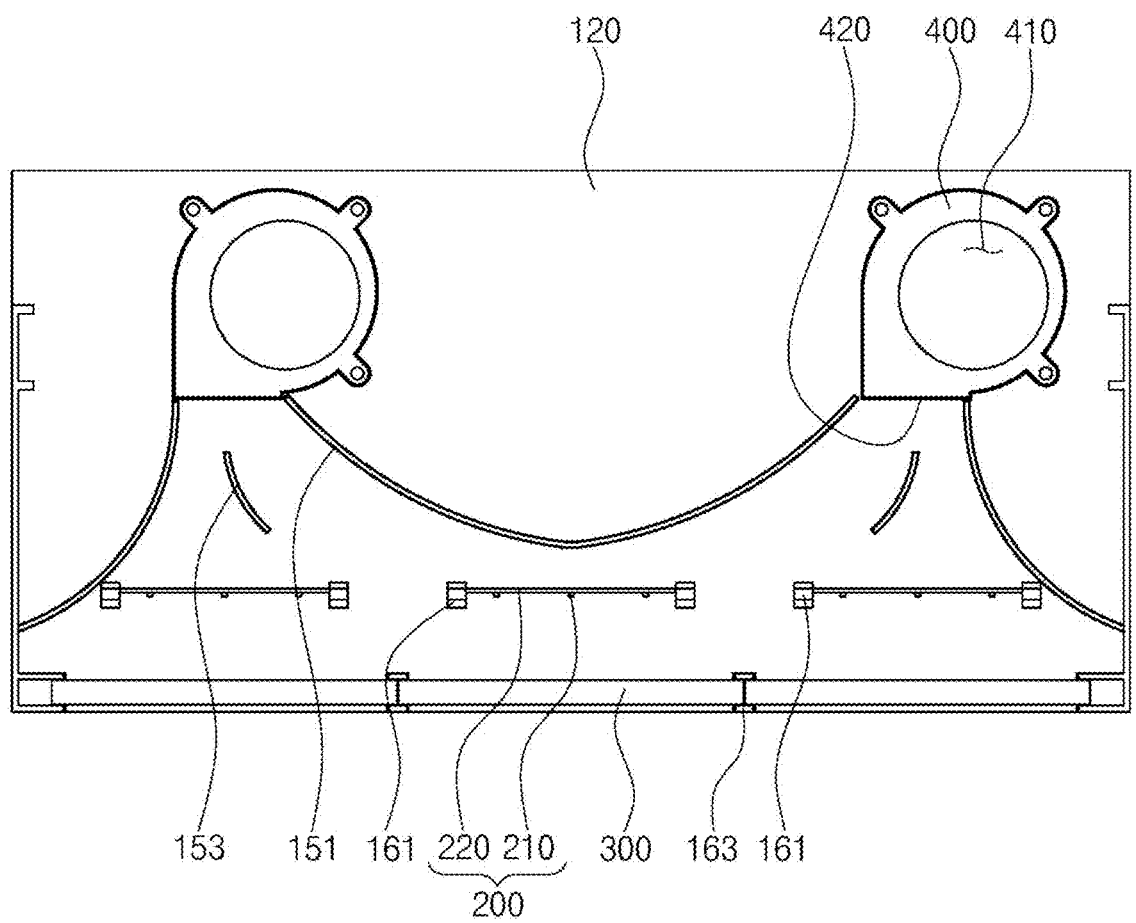
FIG. 4B is a plan view showing a guide connected to a sidewall to separate a space according to exemplary embodiments of the present disclosure.

Referring to FIG. 4B, the guide 150 may be connected to the sidewall to separate a space in which the flow path is formed between the air blower 400 and the filter 300 from a space in which the flow path is not formed (e.g., a space behind the blowing port 420). Particularly, one end of the main guide 151 disposed adjacent to the sidewall may be connected to one side portion of the blowing port 420, and the other end of the main guide 151 disposed adjacent to the sidewall may be connected to the sidewall. Accordingly, the space between the air blower 400 and the filter 300 may be completely separated from other spaces, and thus a more stable flow path is formed.

In addition, in the present exemplary embodiment, a large number of filters 300 may be disposed at positions facing the filter 300 such that the light evenly reaches the filter 300. In the present exemplary embodiment, three filters 300 and three light source units 200 disposed to respectively correspond to the three filters 300 are shown. However, the number of the filters 300 and the number of the light source units 200 should not be limited thereto or thereby. The number of the filters 300 may decrease or increase, and the number of the light source units 200 may decrease or increase to correspond to the number of the filters 300. In the present exemplary embodiment, the filters 300 may correspond to the light source units 200 in a one-to-one relation, but the filters 300 may correspond to the light source units 200 in a one-to-many or many-to-one relation.

Figure 4C:
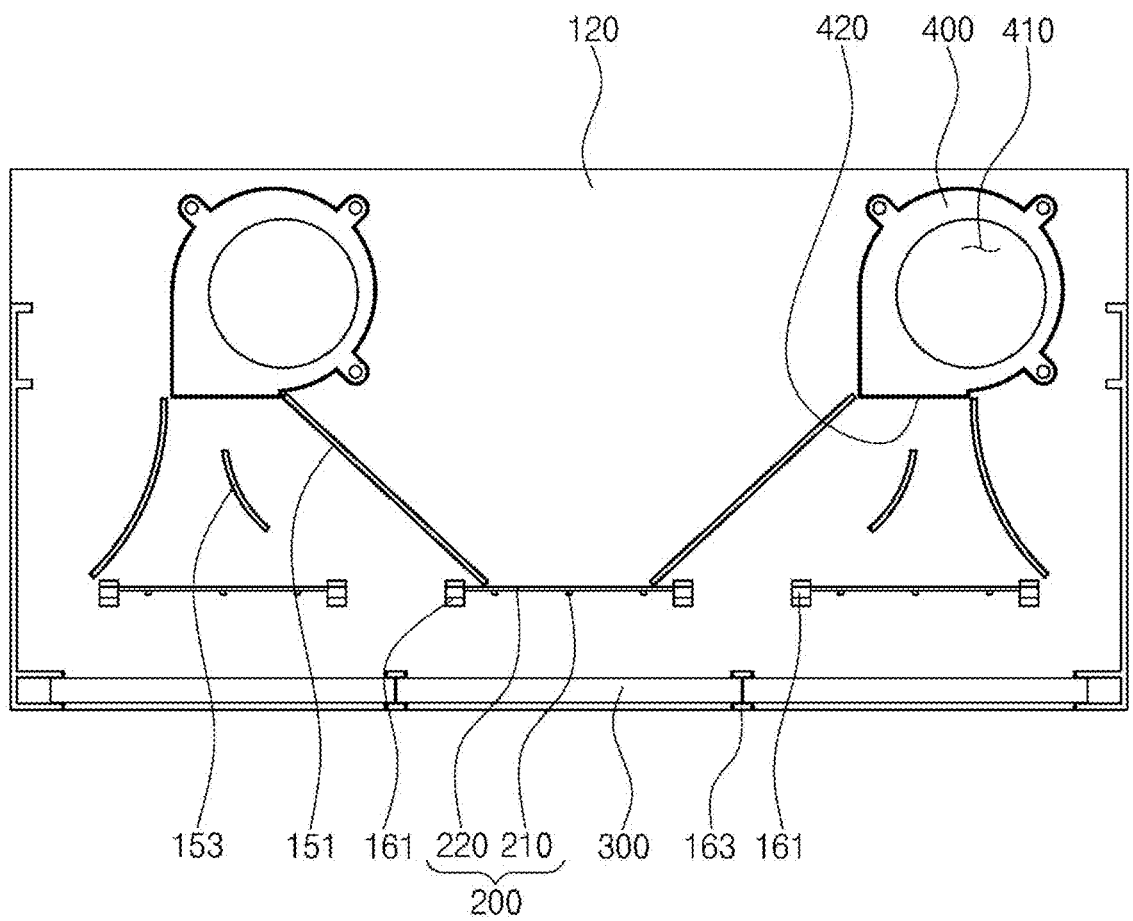
FIG. 4C is a plan view showing a guide connected to a rear surface side of a substrate according to exemplary embodiments of the present disclosure.

Referring to FIG. 4C, the guide 150 may have a shape obtained by combining the straight shape and the curved shape similar to that of FIG. 4A. However, one end of the main guide 151 disposed between the two air blowers 400 may be connected to the blowing port 420, and the other end of the main guide 151 disposed between the two air blowers 400 may be connected to a rear surface side of the substrate 220. In the present exemplary embodiment, since the bowing port 420 faces the filter 300, the area between one air blower 400 and the other air blower 400 corresponds to an area in which the flow rate of the air is relatively weak and a vortex may be generated. Accordingly, the main guide 151 disposed between the two air blowers 400 may be disposed obliquely to the rear surface side of the substrate 220 to reduce the vortex and/or the pressure loss between the two air blowers 400.

Figure 4D:
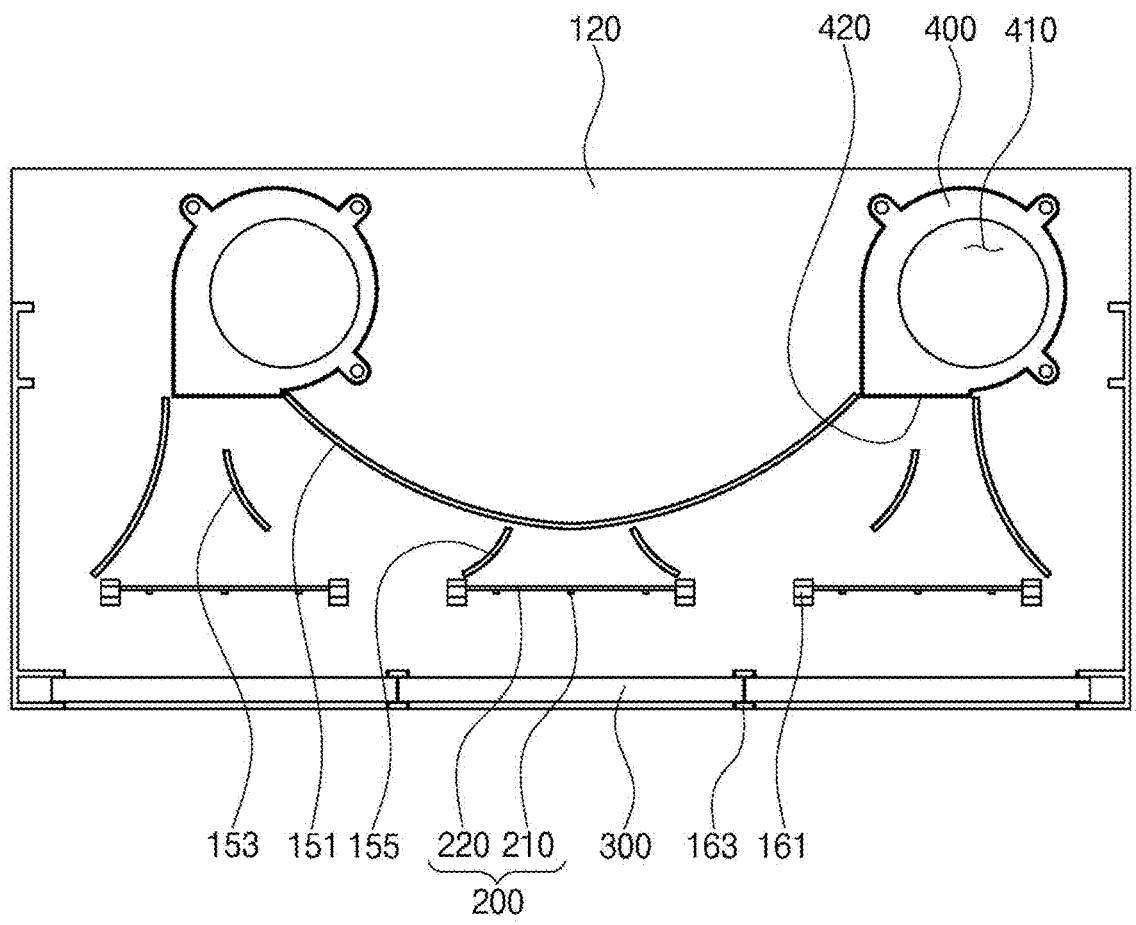
FIG. 4D is a plan view showing a main guide and sub-guides according to exemplary embodiments of the present disclosure.

Referring to FIG. 4D, the guide 150 may further include a second sub-guide 155 in addition to the main guide 151 and the first sub-guide 153. In FIG. 4D, the second sub-guide 155 is disposed behind the light source unit 200 corresponding to the area between the two air blowers 400 to reduce the vortex and/or the pressure loss when three light source units 200 are used. The second sub-guide 155 is disposed behind the substrate 220. The second sub-guide 155 disposed behind the substrate 220 of the light source unit 200 may prevent the vortex and/or the pressure loss generated by the airflow disturbed by the presence of the substrate 220.

Figure 4E:
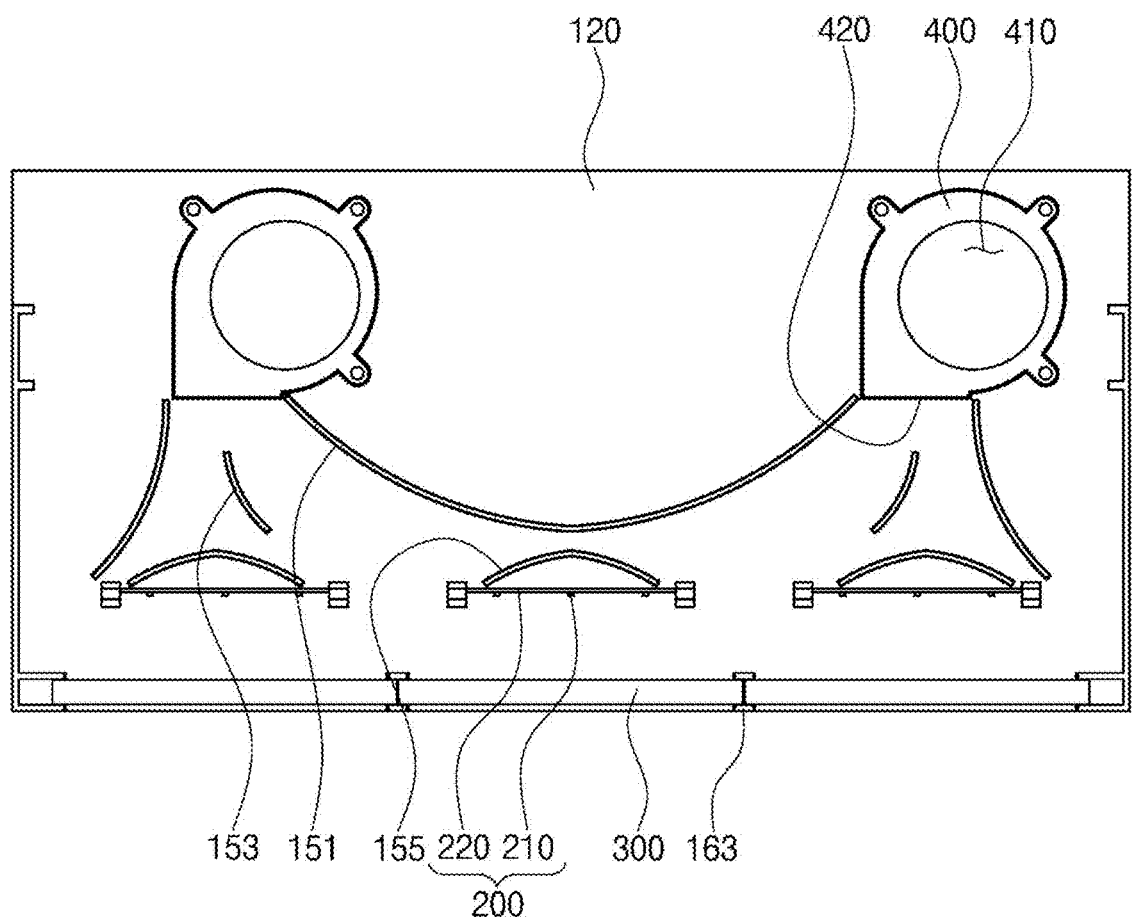
FIG. 4E is a plan view showing another form of a main guide and sub-guides according to exemplary embodiments of the present disclosure.

Referring to FIG. 4E, the guide 150 may further include a second sub-guide 155 in addition to the main guide 151 and the first sub-guide 153 similar to that of FIG. 4D. In the present exemplary embodiment, the second sub-guide 155 has a curved shape so as not to disturb the airflow direction and is provided to cover the rear surface of the substrate 220 of the light source unit 200. Since the second sub-guide 155 has the curved shape, the flow path may be formed along the shape of the second sub-guide 155, and the airflow may be prevented from being disturbed by the rear surface of the substrate 220 of the light source unit 200.

Figure 4F:
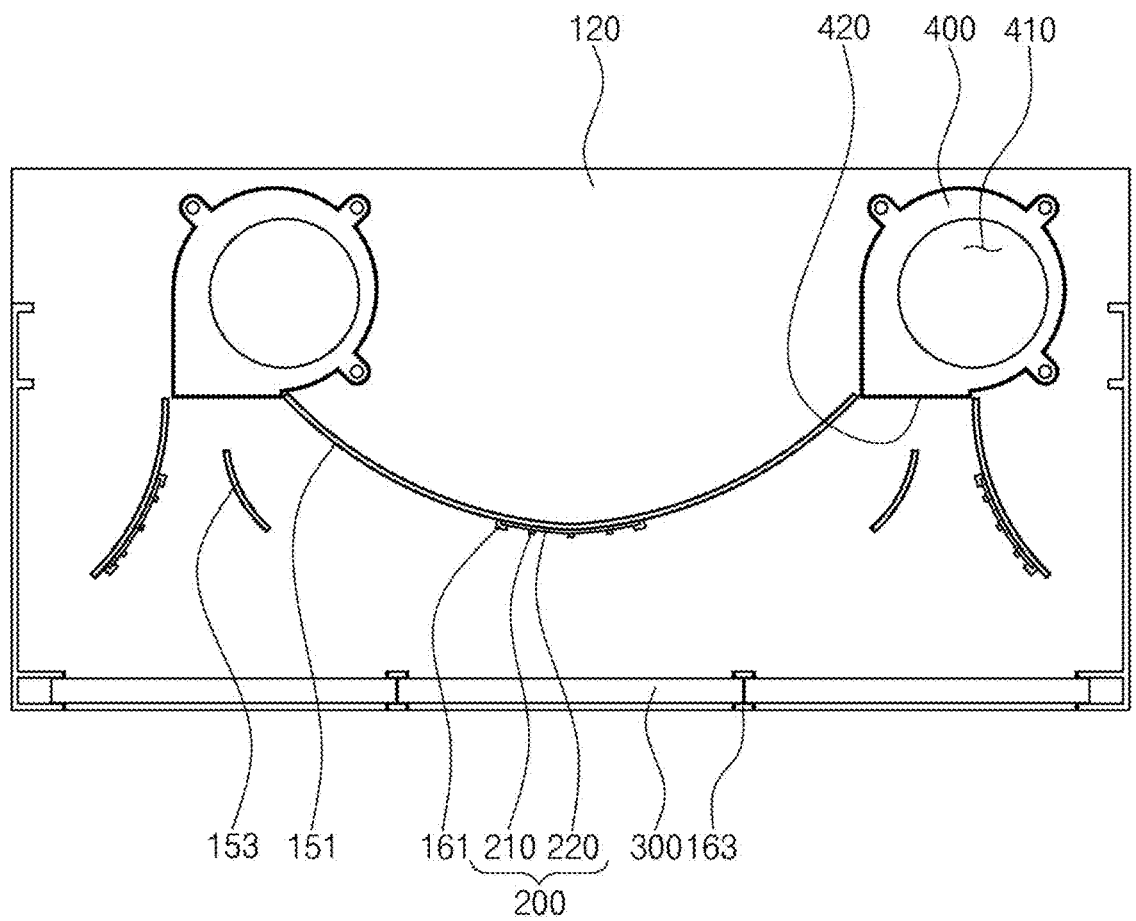
FIG. 4F is a plan view showing a guide used with a light source unit having a curved substrate according to exemplary embodiments of the present disclosure.

Referring to FIG. 4F, the light source unit 200 according to the present exemplary embodiment has a shape different from the above-described embodiments. In the present exemplary embodiment, the substrate 220 of the light source unit 200 may be curved or bent to provide more light to the filter 300. For example, the substrate 220 may be formed in the curved shape or bent in a V shape. In addition, the light source unit 200 may be provided obliquely with respect to the filter 300 not to disturb the flow of the air.

In the present exemplary embodiment, the substrate 220 of the light source unit 200 has the curved shape, is disposed obliquely with respect to the filter 300, and is attached to the guide 150. However, according to another exemplary embodiment, the substrate 220 may have the curved shape and may be separated from the guide 150, or the substrate 220 may be disposed obliquely with respect to the filter 300 although the shape of the substrate 220 is not curved. As another way, at least one of the substrate 200 may be attached to the guide 150.

The air cleaning module according to the exemplary embodiment of the present disclosure may include various types of light source units and filters, and thus the light source unit may be disposed in various ways and may be provided in various numbers.

FIGS. 5A to 5E are plan views showing a guide according to exemplary embodiments of the present disclosure. In the following embodiments, different features from those of the above-described embodiments will be mainly described in order to avoid redundancy. Unexplained portions are similar to those of the above-described embodiments.

Figure 5A:
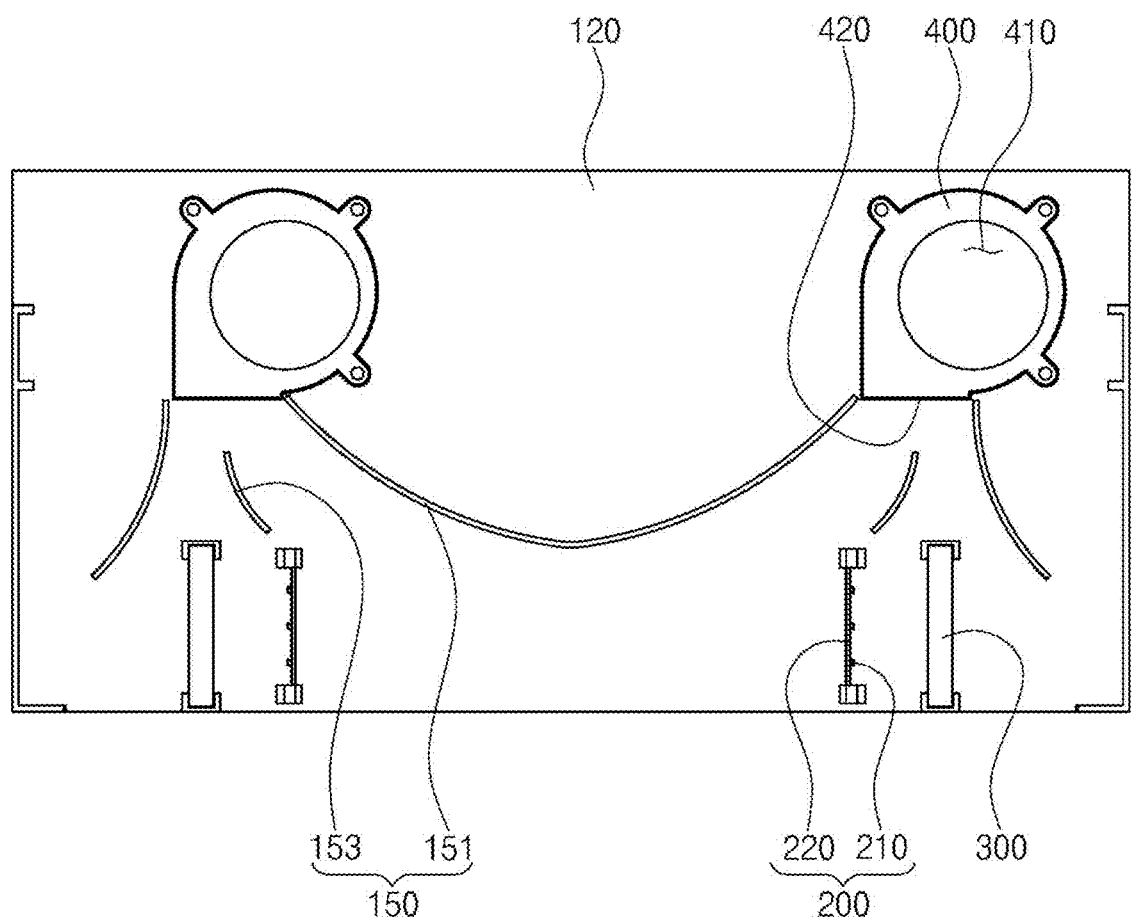
FIG. 5A is a plan view showing a guide where air flows in a direction parallel to a filter according to exemplary embodiments of the present disclosure.
Figure 5B:
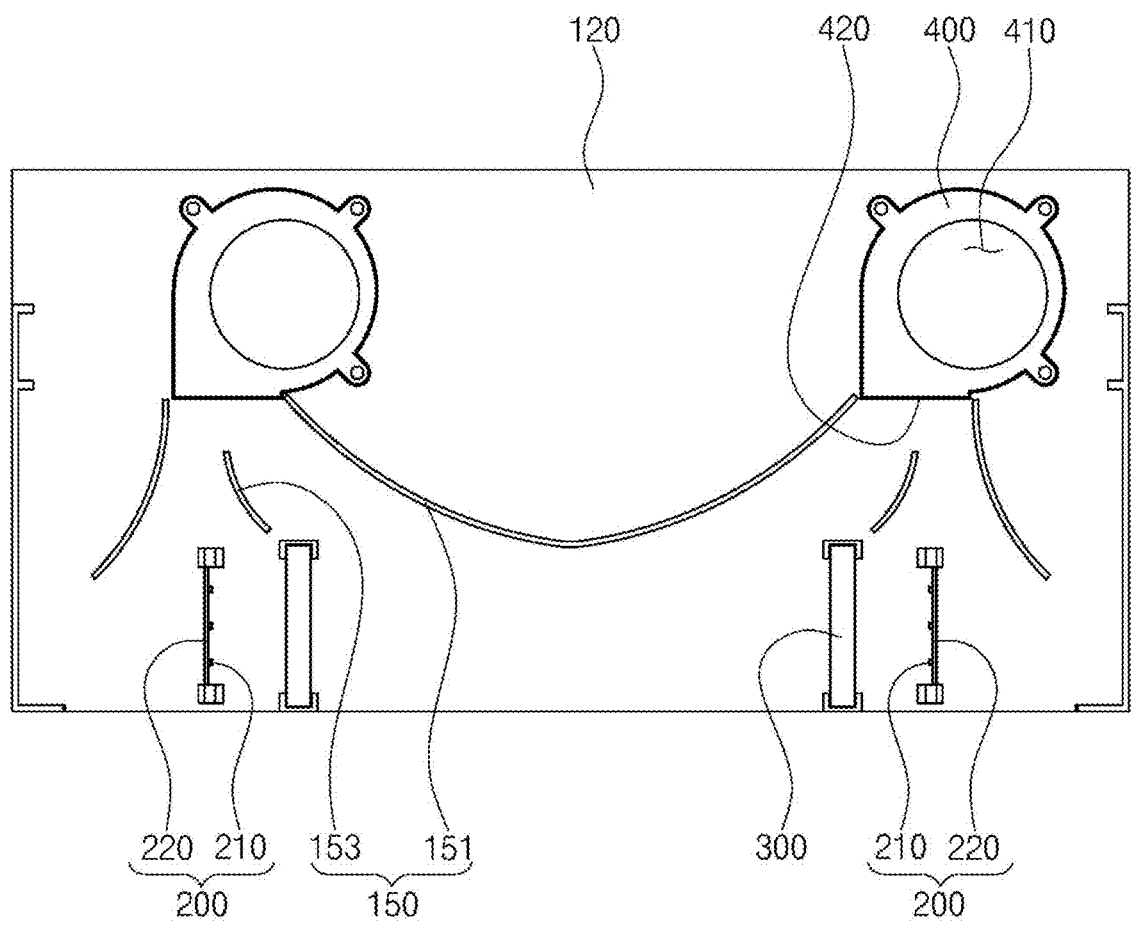
FIG. 5B is a plan view showing different numbers and arrangements relationship of the light source unit and the filter from FIG. 5A according to exemplary embodiments of the present disclosure.
Figure 5C:
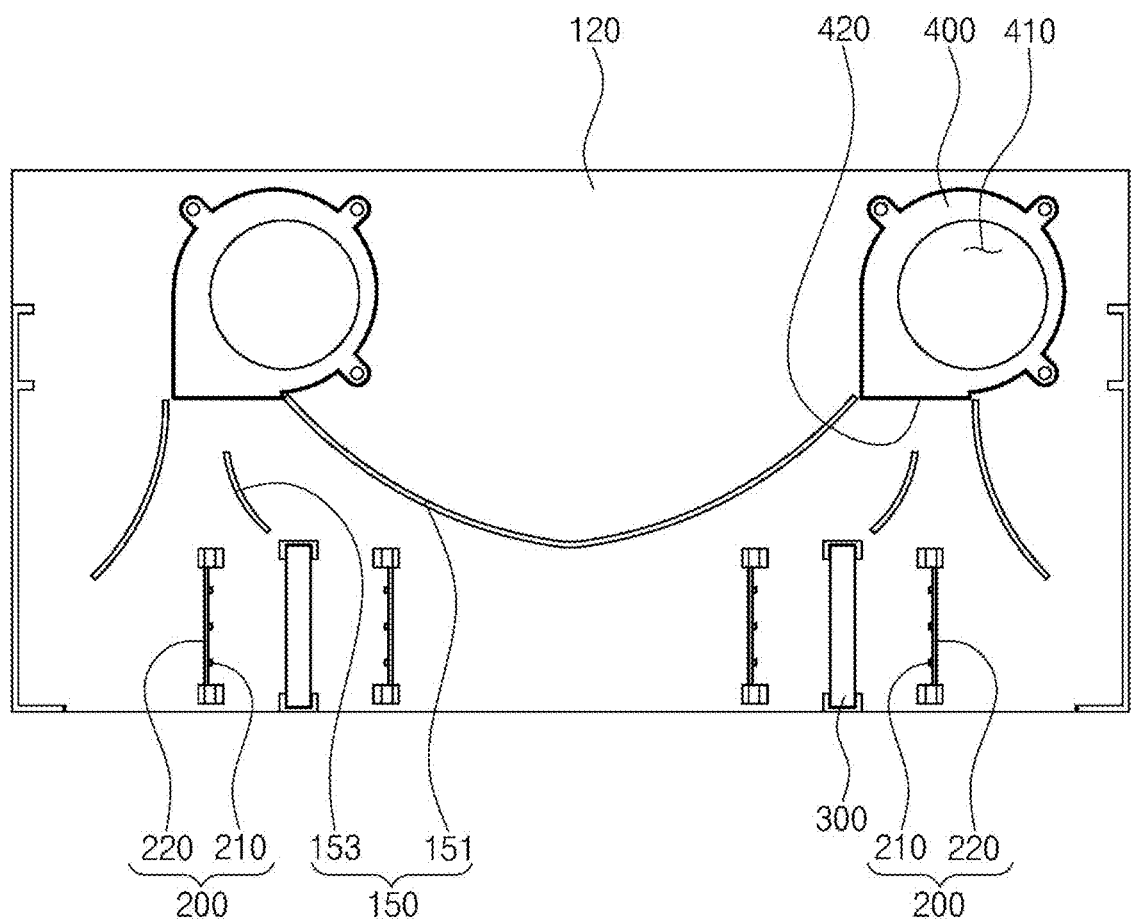
FIG. 5C is a plan view showing different numbers and arrangements relationship of the light source unit and the filter from FIG. 5B according to exemplary embodiments of the present disclosure.
Figure 5D:
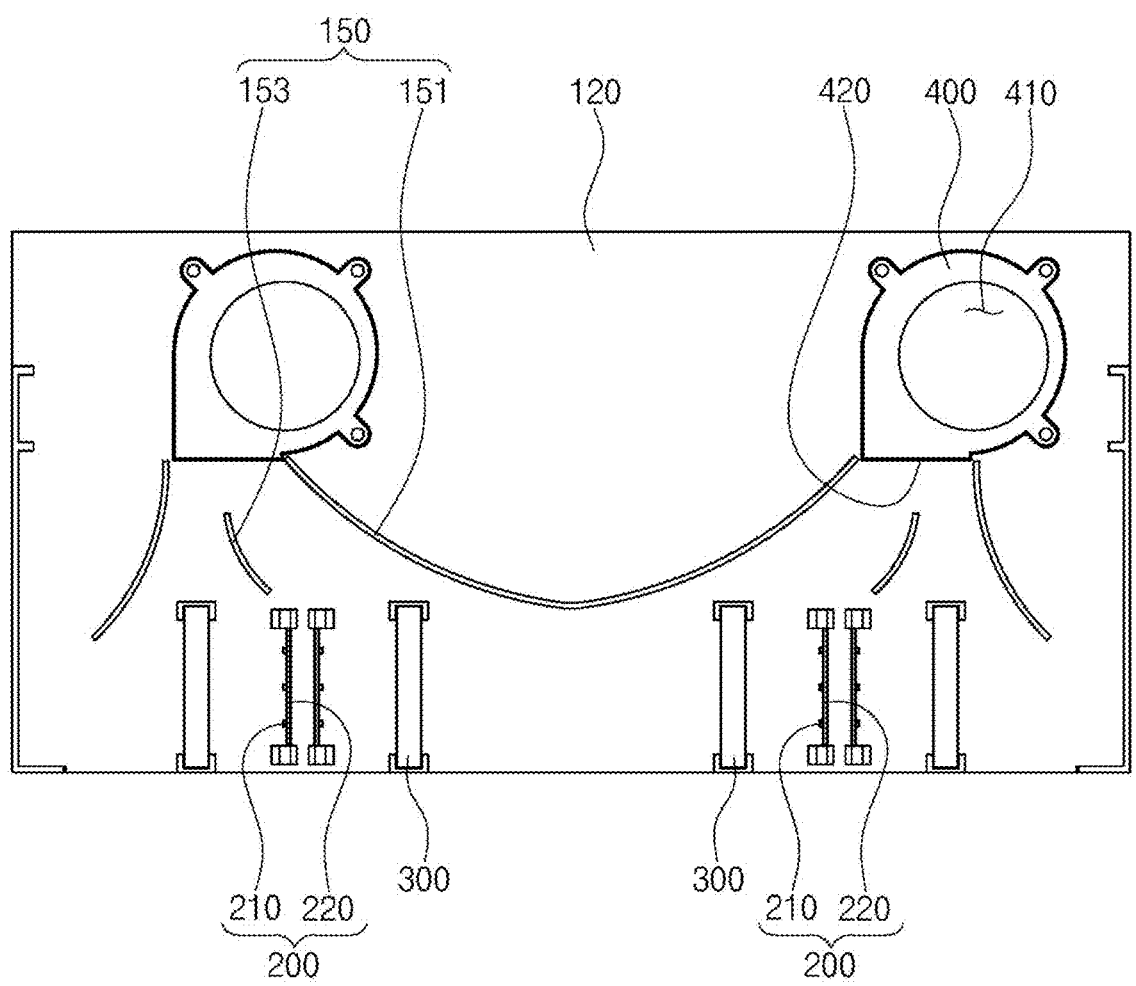
FIG. 5D is a plan view showing different numbers and arrangements relationship of the light source unit and the filter from FIG. 5C according to exemplary embodiments of the present disclosure.
Figure 5E:
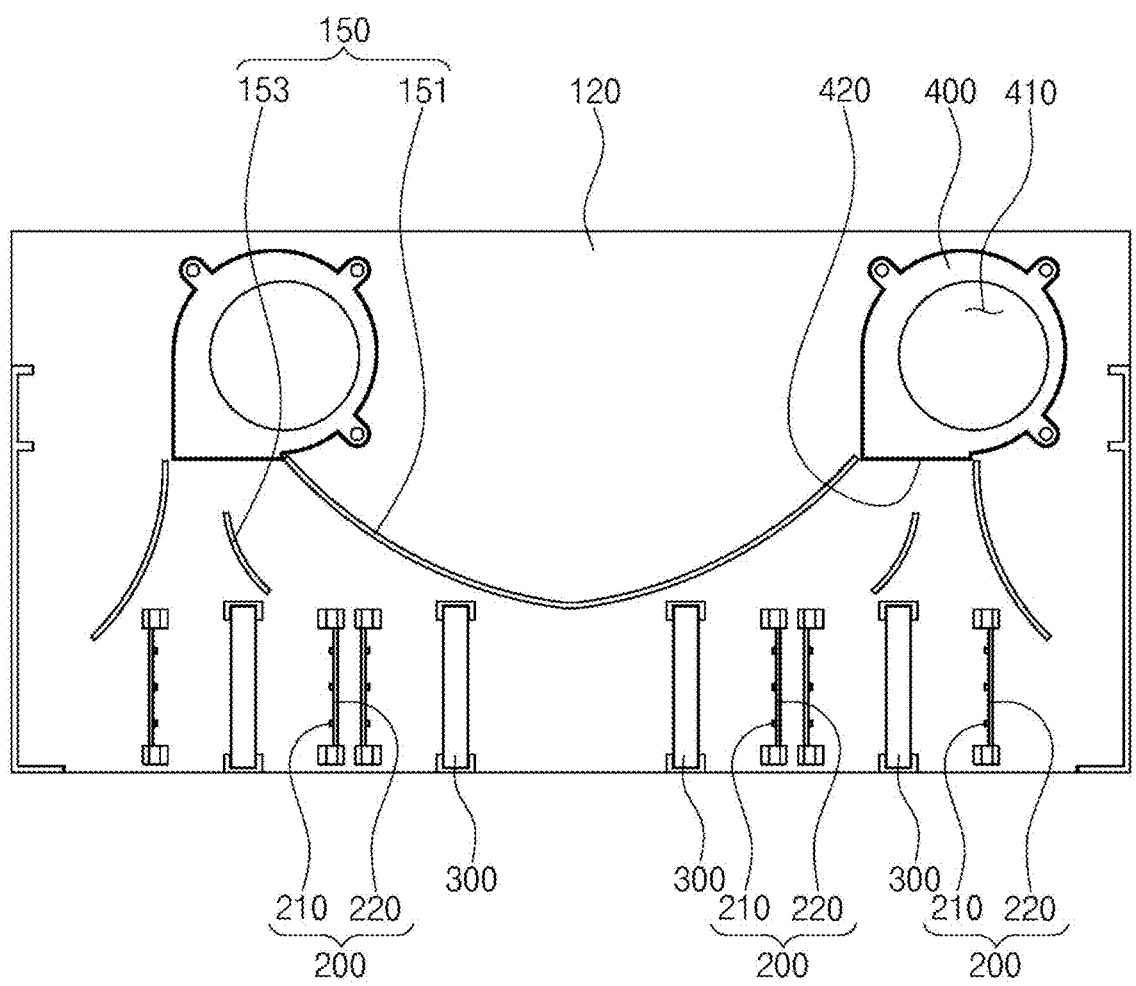
FIG. 5E is a plan view showing different numbers and arrangements relationship of the light source unit and the filter from FIG. 5D according to exemplary embodiments of the present disclosure.

Referring to FIG. 5A, the light source unit 200 and the filter 300 are disposed obliquely or parallel to the airflow direction. In this case, the substrate 220 of the light source unit 200 may be spaced apart from the filter 300 and disposed substantially parallel to the filter 300.

In the above-described embodiments, the filter 300 is disposed to face the airflow direction, and thus the flow path is formed passing through the filter 300. However, according to the present exemplary embodiment, since the flow path is disposed obliquely or parallel to the filter 300, the flow path is formed substantially parallel to the filter 300 and the light source unit 200 without passing through the filter 300. In other words, the air flows in a direction oblique to front and rear surfaces of the filter 300 but as a whole, the air flows in a direction parallel to the front and rear surfaces of the filter 300 without passing through the filter 300. In this case, the front or rear surface of the filter 300 may be disposed substantially parallel to the direction in which the air flows, i.e., the flow path.

Similar to FIG. 5A, FIGS. 5B to 5E show a structure in which the flow path is disposed substantially parallel to or obliquely to the direction in which the light source unit 200 and the filter 300 are elongated. In FIGS. 5B to 5E, only the number and arrangement relationship of the light source units 200 and the filters 300 are set differently.

In the exemplary embodiments of the present disclosure, the number of the filters 300 and the number of the light source units 200 corresponding to the filters 300 may be changed in various ways to improve the photocatalytic reaction efficiency.

According to an exemplary embodiment of the present disclosure, a sensor 500 may be provided in an area other than the flow path to sense a material in the fluid.

Figure 6A:
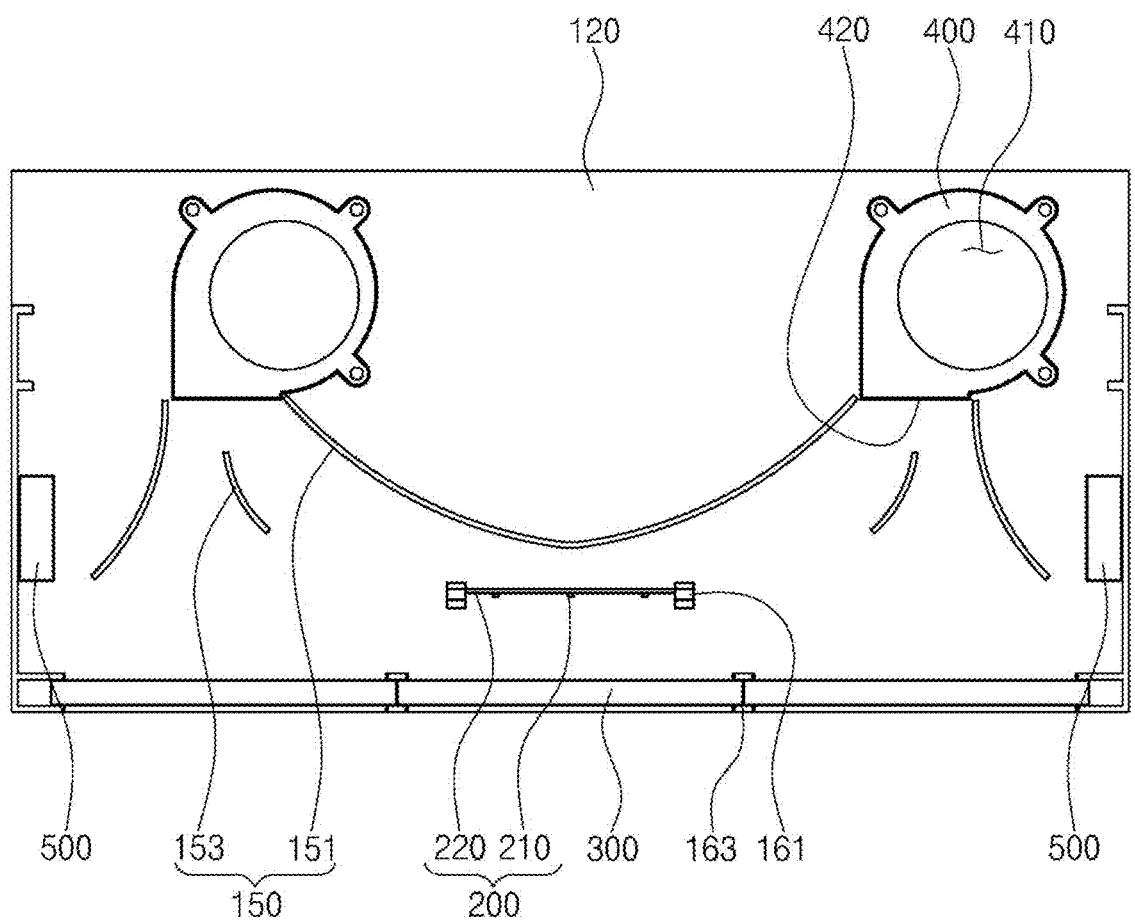
FIG. 6A is a plan view showing a display module with a sensor according to an exemplary embodiment of the present disclosure.
Figure 6B:
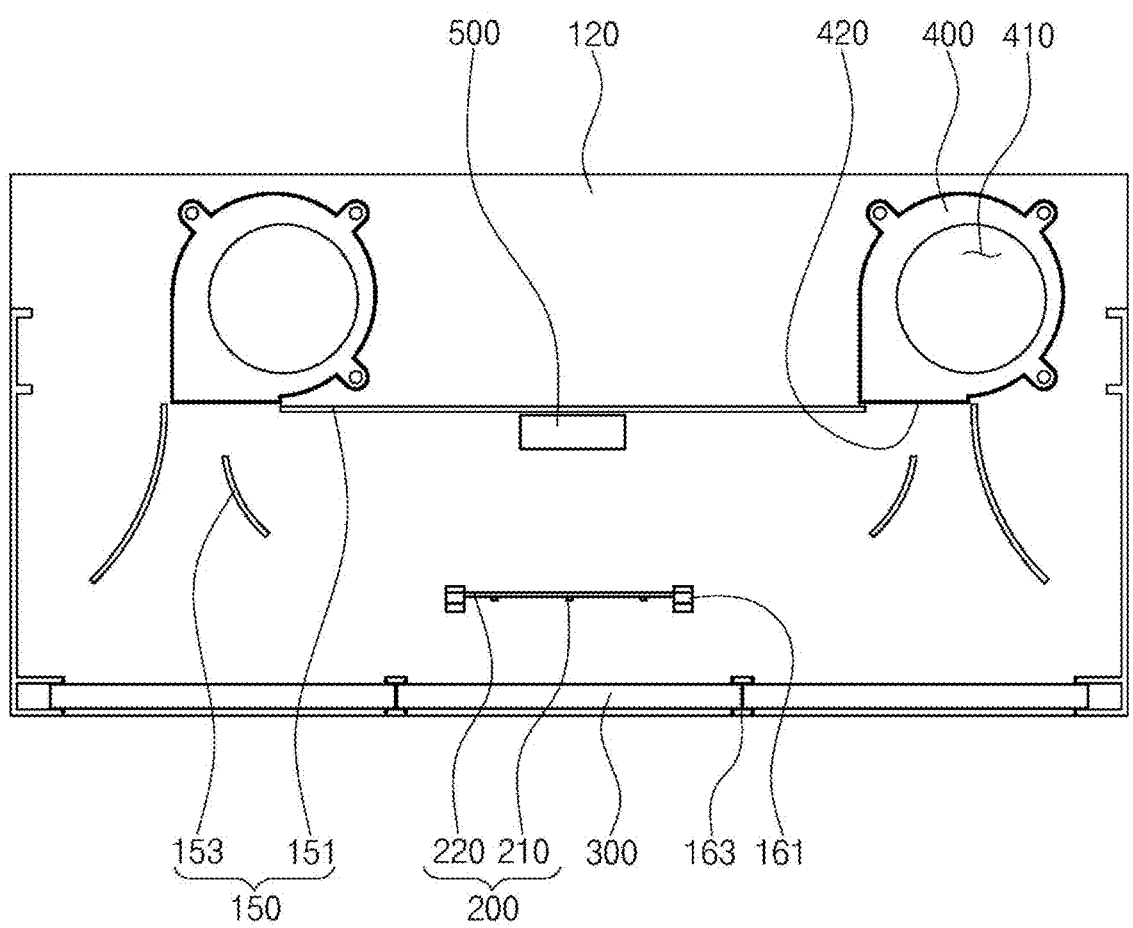
FIG. 6B is a plan view showing a sensor arranged differently from FIG. 6A according to an exemplary embodiment of the present disclosure.

FIGS. 6A and 6B are plan views showing a display module with the sensor 500 according to an exemplary embodiment of the present disclosure.

The sensor 500 is used to sense whether dust, predetermined gas, or organic material are present in the air, and if so, to sense the type and content of the dust, gas, or organic material contained in the air. The sensor 500 is provided in an area relatively deviated from the flow path through which the air introduced by the air blower 400 is provided to the filter 300. However, the sensor 500 is disposed in a space that is not separated from the air being introduced to sense the dust or other matter in the air sucked by the air blower 400 from outside to inside.

The sensor 500 is provided in the inner space of the housing 100 and disposed in an area in which the flow path is not provided among areas divided by the guide 150. For instance, the sensor 500 may be provided behind the guide 150 as shown in FIG. 6A.

In addition, the sensor 500 may be disposed in an area in which the flow rate of the air is low even though the sensor 500 is provided in an area in which the flow path is provided among areas divided by the guide 150. For instance, the sensor 500 may be disposed between the two air blowers 400 as shown in FIG. 6B.

As described above, since the sensor 500 is provided in the area outside the flow path, accuracy and precision with respect to a target material may be improved, and the flow rate may be prevented from being varied due to the sensor 500. In a case where the sensor 500 is disposed on the flow path, the accuracy or precision of measured values may be degraded when the target material, such as the dust, gas, or organic material, is measured, and the sensor 500 acts as a resistance to the flow of the air. Accordingly, reduction in airflow and pressure loss may occur.

The sensor 500 should not be particularly limited as long as the sensor 500 may sense the target material, e.g., the dust, the predetermined gas, or the organic material, etc., to deodorize, and various types of sensors 500 may be used. The sensor 500 may be provided on at least one of the upper housing 110 and the lower housing 120. Further, one sensor 500 may be used, or as shown in FIGS. 6A and 6B, one or two sensors 500 may be used. In addition, the number of the sensors 500 may increase to three or more as needed.

Data, such as the type and content of target material, sensed by the sensor 500 may be associated with the operation of the air cleaning module, and the air cleaning module according to the exemplary embodiment of the present disclosure may further include a driver (not shown) that receives sensing information from the sensor 500 and controls the air blower 400 and/or the light source unit 200. In the present exemplary embodiment, the sensing information refers to the existence or absence of the target material and the type and/or content of the sensed material.

In addition, the air cleaning module may further include a display (not shown) to display the sensing information from the sensor 500 or a control state of the air blower 400 and/or the light source unit 200 to a user.

When the sensor 500 senses target materials, such as dust, specific gas, specific organic material, etc., the driver may turn on the light source unit 200 and the air blower 400. When the sensor 500 does not sense the target materials or senses the target materials in a predetermined amount or less, the driver may turn off the light source unit 200 and the air blower 400. In addition, when the sensor 500 sense the target materials in a predetermined concentration or more, the driver may increase the number of rotations of the fan of the air blower 400 or may increase the amount of the light from the light source unit 200. As described above, the driver may automatically control whether to drive a touch module or not and intensity at the time of driving in association with the data from the sensor 500. The display part provides a user with information from the sensor 500 or driving information from the driver, and the user may easily acquire information through an interface. The user may manually control whether to drive the touch module or not and the intensity at the time of driving based on the information from the display part. In the case where the user operates the touch module, devices, such as a remote controller and an internet-based wireless terminal, may be used.

Figure 7:
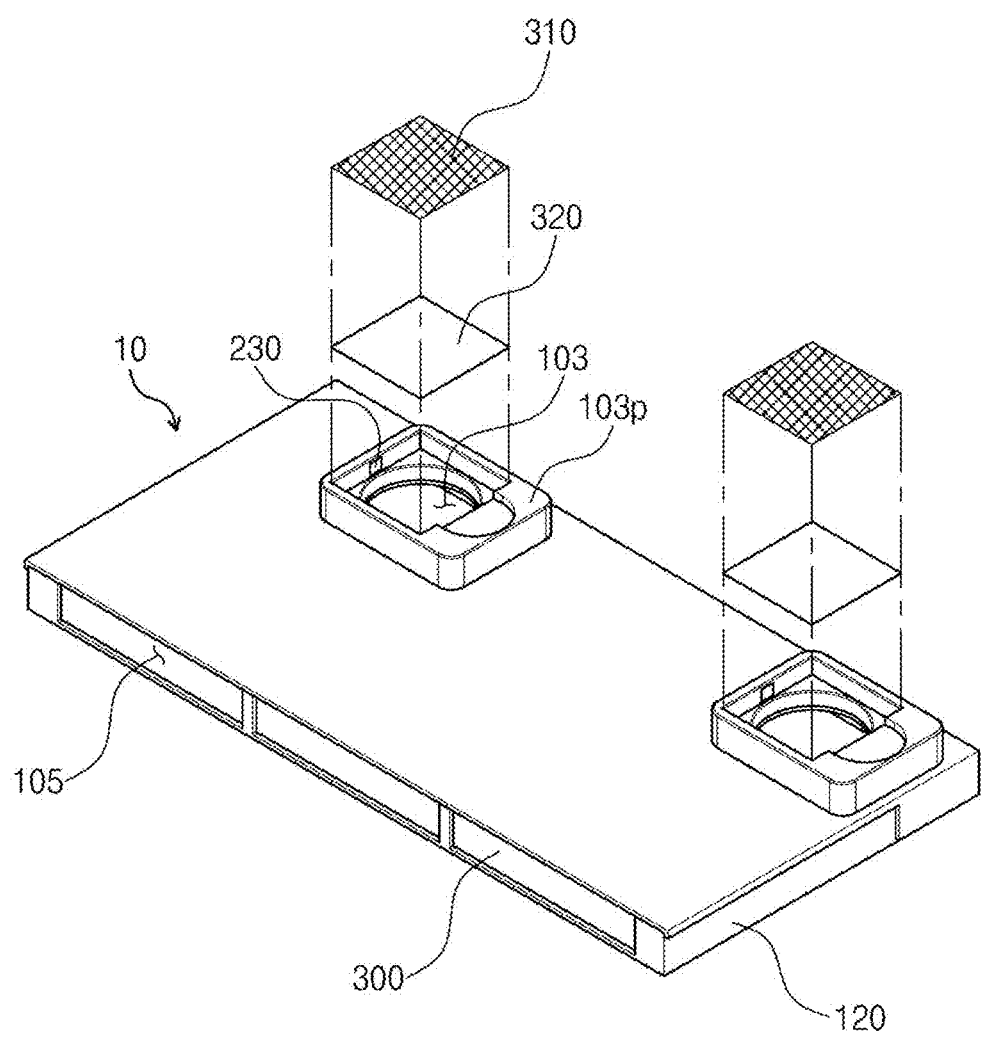
FIG. 7 is a perspective view showing an air cleaning module in which additional filters are mounted on an inlet according to an exemplary embodiment of the present disclosure.

The air cleaning module according to the exemplary embodiment of the present disclosure may further include additional components to improve an air cleaning function in addition to the deodorization function. FIG. 7 is a perspective view showing an air cleaning module in which additional filters are mounted on an inlet according to an exemplary embodiment of the present disclosure.

Referring to FIG. 7, the air cleaning module may further include a first additional filter 310 and a second additional filter 320, which are mounted on the inlet 103.

The first additional filter 310 may be a dust filter for filtering out particles above a predetermined size. The second additional filter 320 may be a fine particle filter (e.g., the HEPA filter) for filtering out particles of relatively small size, which are not filtered by the dust filter. The first and second additional filters 310 and 320 may be placed on a supporter 103p coupled to the first and second additional filters 310 and 320.

Since the first and second additional filters 310 and 320 are further mounted, a foreign substance, e.g., dust, may be removed by the air cleaning module, and the air cleaning effect may be improved.

In the present exemplary embodiment, the first and second additional filters 310 and 320 have a quadrangular shape, however, the shape of the first and second additional filters 310 and 320 should not be limited thereto or thereby and may be changed depending on the shape of the inlet 103 or the overall shape of the air cleaning module.

In addition, in the present exemplary embodiment, the air cleaning module may further include an additional light source 230 that provides a predetermined light to the first and second additional filters 310 and 320. The additional light source 230 may be provided on the supporter 103p on which the first and second additional filters 310 and 320 are placed as shown in FIG. 7. However, a position of the additional light source 230 should not be limited thereto or thereby, and the additional light source 230 may be formed at a position where a sterilization light reaches the first and second additional filters 310 and 320, for example, between the first and second additional filters 310 and 320, between the air blower 400 and the first and second additional filters 310 and 320, or outside of the air blower 400.

The additional light source 230 may emit the light having a sterilization function to minimize the growth of germs. For instance, the additional light source 230 may emit the light at a wavelength band from about 100 nm to about 280 nm, which is an ultraviolet C wavelength band.

In the present exemplary embodiment, the first and second additional filters 310 and 320 may be a filter having another function rather than those of the dust filter or HEPA filter, and another filter may be further added. In addition, the additional light source 230 may emit a light at a wavelength band rather than the sterilization wavelength. As an example, the first additional filter 310 may be the dust filter, and the second additional filter 320 may be a deodorization filter. As another example, the first additional filter 310 may be the dust filter, and the second additional filter 320 may be a photocatalytic filter. When the second additional filter 320 is the deodorization filter, the additional light source 230 may be or may not be mounted. When the second additional filter 320 is a photocatalytic filter, the additional light source 230 may emit a light at a wavelength, which reacts with the photocatalyst of the photocatalytic filter.

Figure 8A:
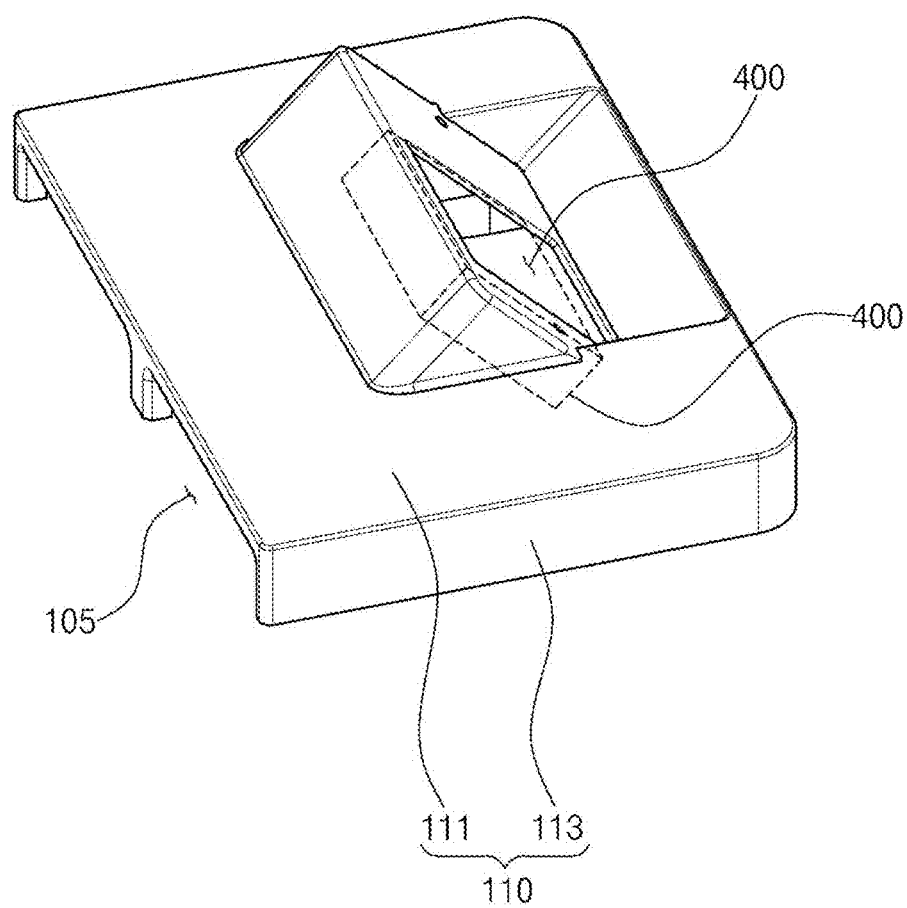
FIG. 8A is a perspective view showing an air cleaning module employing an air blower in which an air suction direction and a blowing direction are the same as each other.
Figure 8B:
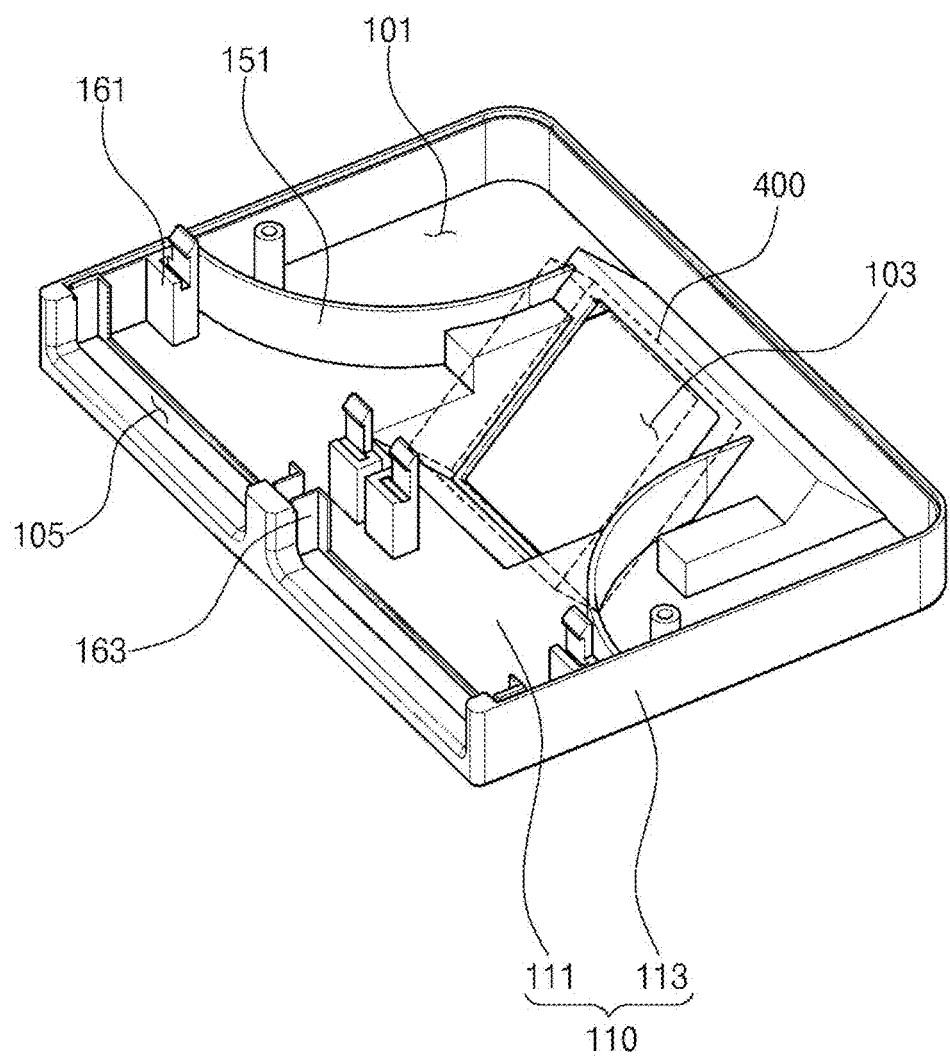
FIG. 8B is a perspective view showing a rear side of the air cleaning module shown in FIG. 8A.

According to the exemplary embodiment of the present disclosure, various structures of air blower 400 may be used. FIG. 8A is a perspective view showing an air cleaning module employing an air blower in which an air suction direction and a blowing direction are the same as each other, and FIG. 8B is a perspective view showing a rear side of the air cleaning module shown in FIG. 8A. For the convenience of explanation, FIGS. 8A and 8B show only the upper housing 110, other components are omitted, and the air blower 400 is indicated by a dotted line. Different from the above-described embodiments, the air cleaning module including one air blower 400, two filters 300, and two light source units 200 will be described in the present exemplary embodiment. The filter 300 and the light source unit 200, which are not shown, may be mounted on the filter fixing part 163 and the light source fixing part 161, respectively.

Referring to FIGS. 8A and 8B, the air blower 400 may have a structure in which the air suction direction and the blowing direction are the same as each other or a structure in which the air suction direction and the blowing direction are different from each other depending on its structure and direction of arrangement, particularly, arrangement of the fan. In the present exemplary embodiment, the air blower 400, in which the air suction direction and the blowing direction are the same as each other, may be used, and the air blower 400 is obliquely mounted on the ceiling 111 of the housing 100 to allow the blowing port 420 to be placed at a position facing the filter 300 while maintaining a thin thickness of the air cleaning module. The inlet 103 from which the air is introduced to the air blower 400 may be also obliquely formed.

The air cleaning module having the above-described structure according to the exemplary embodiment of the present disclosure may be applied to a variety of home appliances or furniture.

Figure 9:
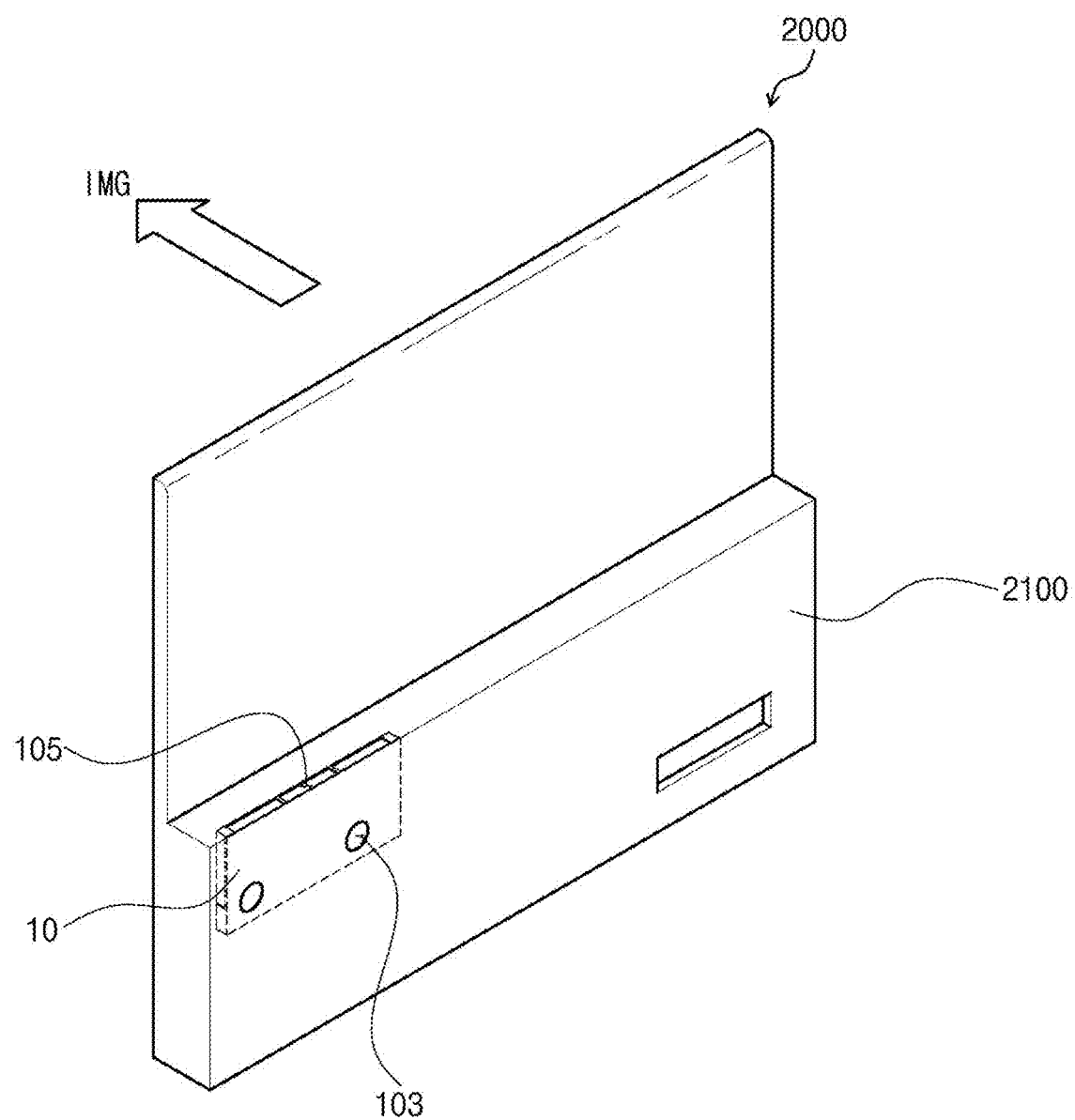
FIG. 9 is a perspective view showing an air cleaning module mounted on home appliances according to an exemplary embodiment of the present disclosure.

FIG. 9 is a perspective view showing an air cleaning module 10 mounted on a thin television 2000 that is one of the home appliances according to an exemplary embodiment of the present disclosure. However, the air cleaning module according to an exemplary embodiment of the present disclosure may be applied not only to the television but also to other home appliances, furniture, or other installations when deodorization and purification of the air are necessary.

Referring to FIG. 9, the air cleaning module 10 may be mounted on a rear surface of the television 2000. The television 2000 displays an image IMG through a front surface thereof, and an external cover 2100 may be provided on the rear surface of the television 2000 to cover the rear surface. The air cleaning module 10 may be provided inside the external cover 2100. The external cover 2100 of the television 2000 includes an opening defined therethrough, and the opening may be used as the inlet 103 and the outlet 105 of the air cleaning module 10. The external cover and the inlet 103 and the outlet 105 of the air cleaning module 10 may be varied depending on the mounting position of the air cleaning module 10. In the present exemplary embodiment, a portion of the housing 100 of the air cleaning module 10 may be integrally formed with the external cover 2100 of the television 2000. In addition, other inner components of the television 2000, for example, the substrate 220, may be integrally formed with a portion of the housing 100 of the air cleaning module 10.

As described above, the air cleaning module 10 may be applied to various apparatuses.

The air cleaning module 10 according to the exemplary embodiment of the present disclosure may have improved deodorization effect when compared with a conventional air cleaning module. Experimental results obtained using the air cleaning module 10 according to the exemplary embodiment of the present disclosure are as follows.

Figure 10:
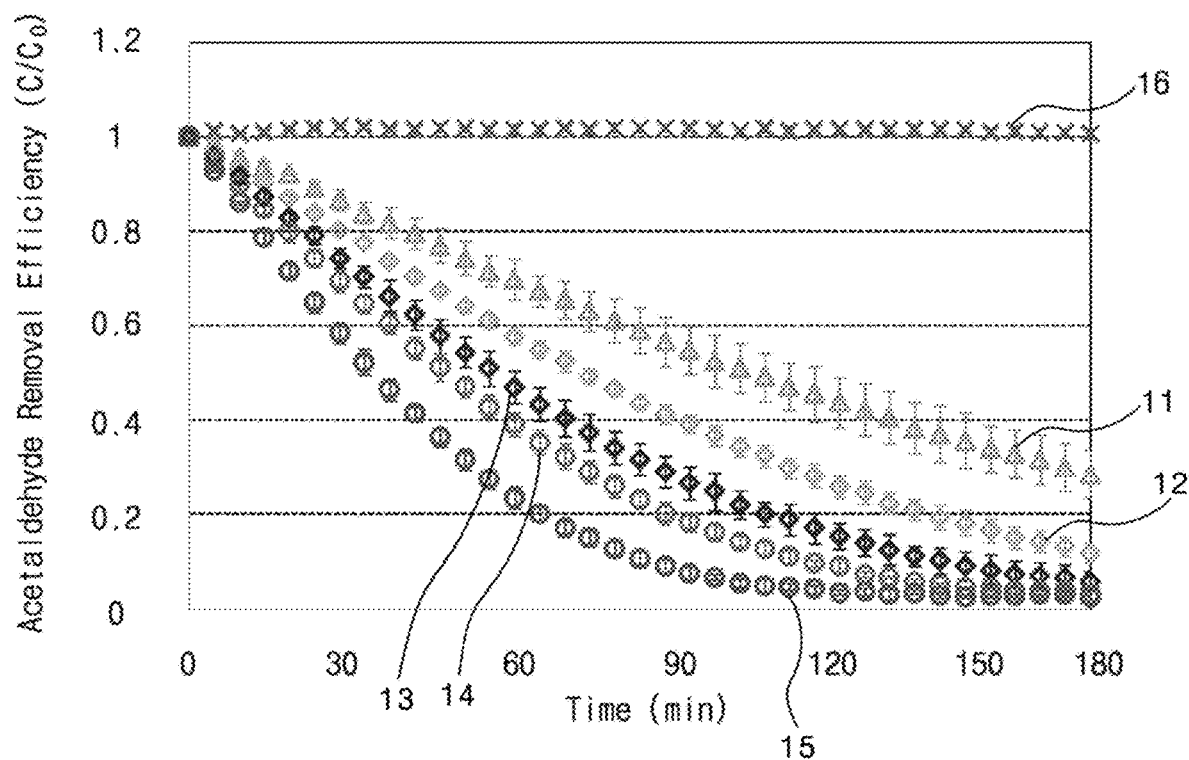
FIG. 10 is a graph showing a removal efficiency of acetaldehyde over time when the air is treated using the air cleaning module.
Figure 11A:
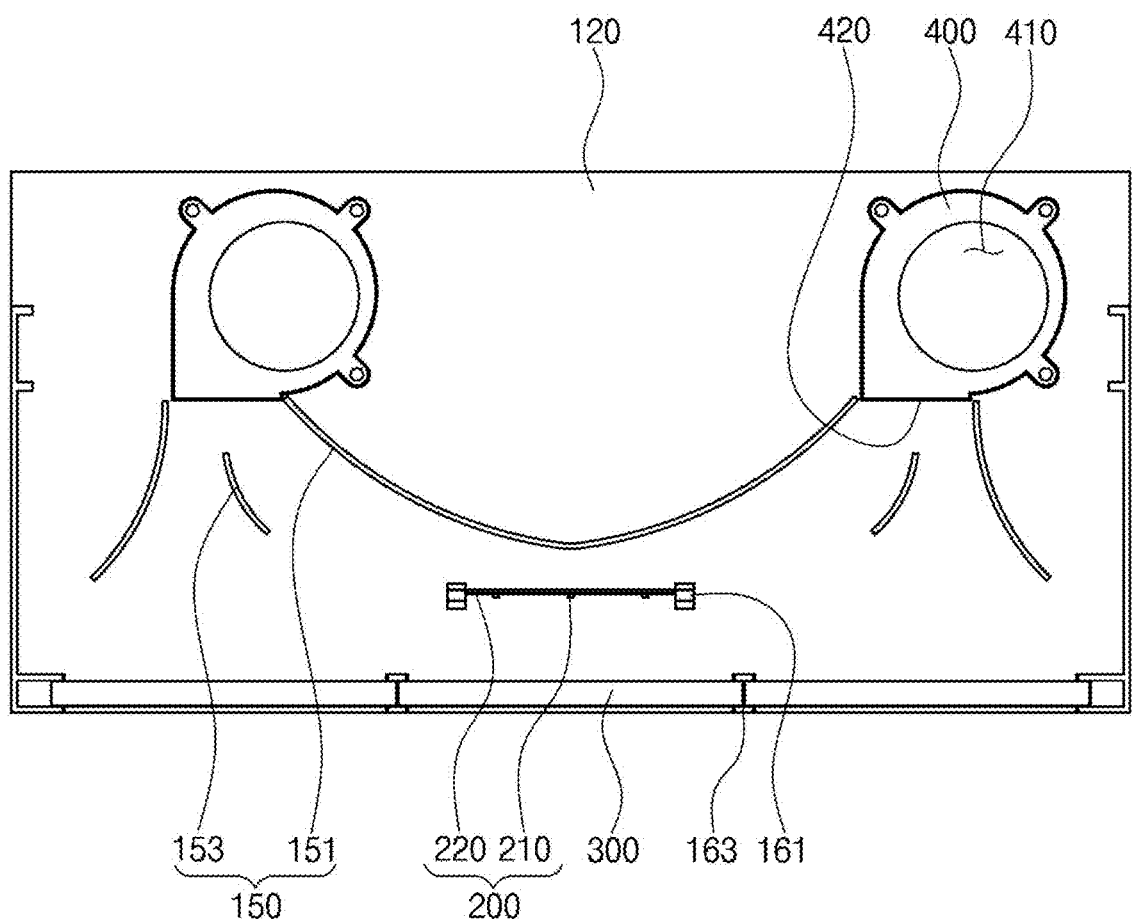
FIG. 11A is a plan view showing a structure of the air cleaning module used in FIG. 9 having a light source unit.
Figure 11B:
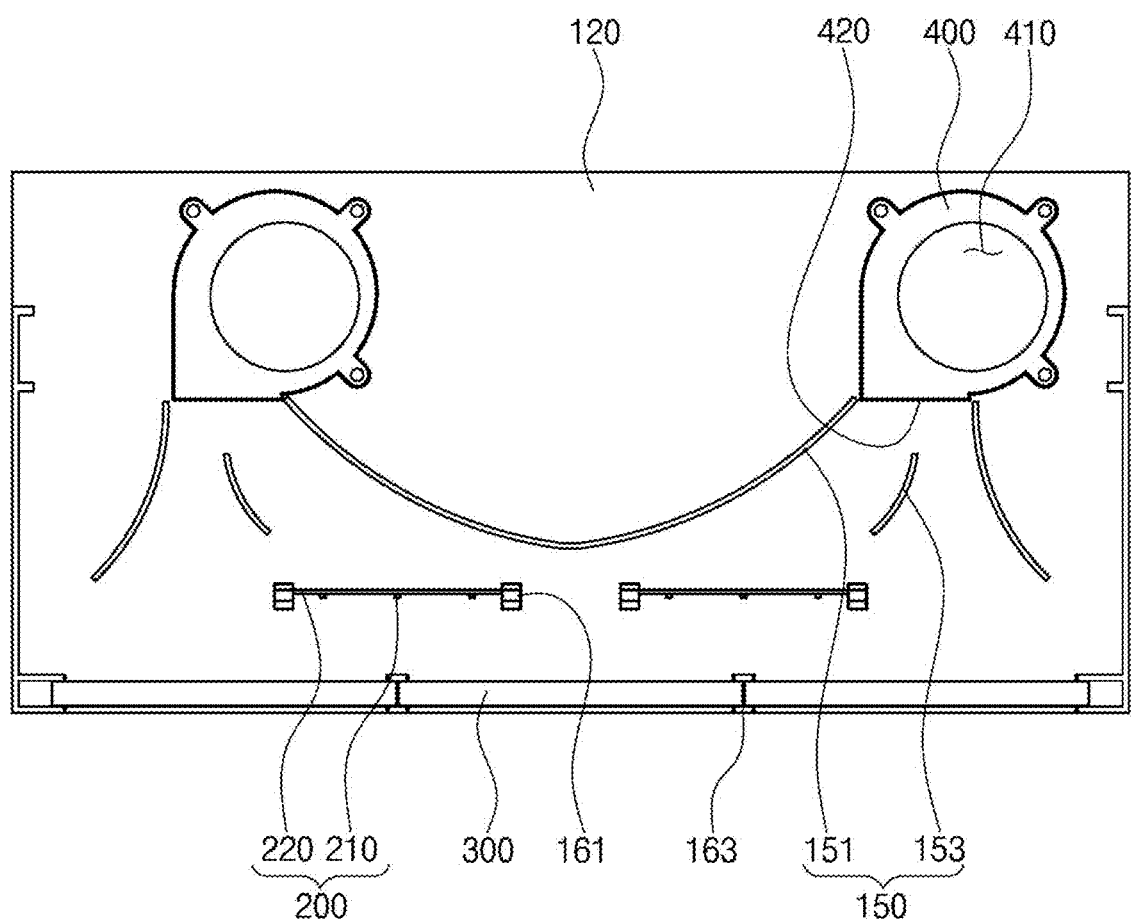
FIG. 11B is a plan view showing a structure of the air cleaning module used in FIG. 9 having two light source units.
Figure 11C:
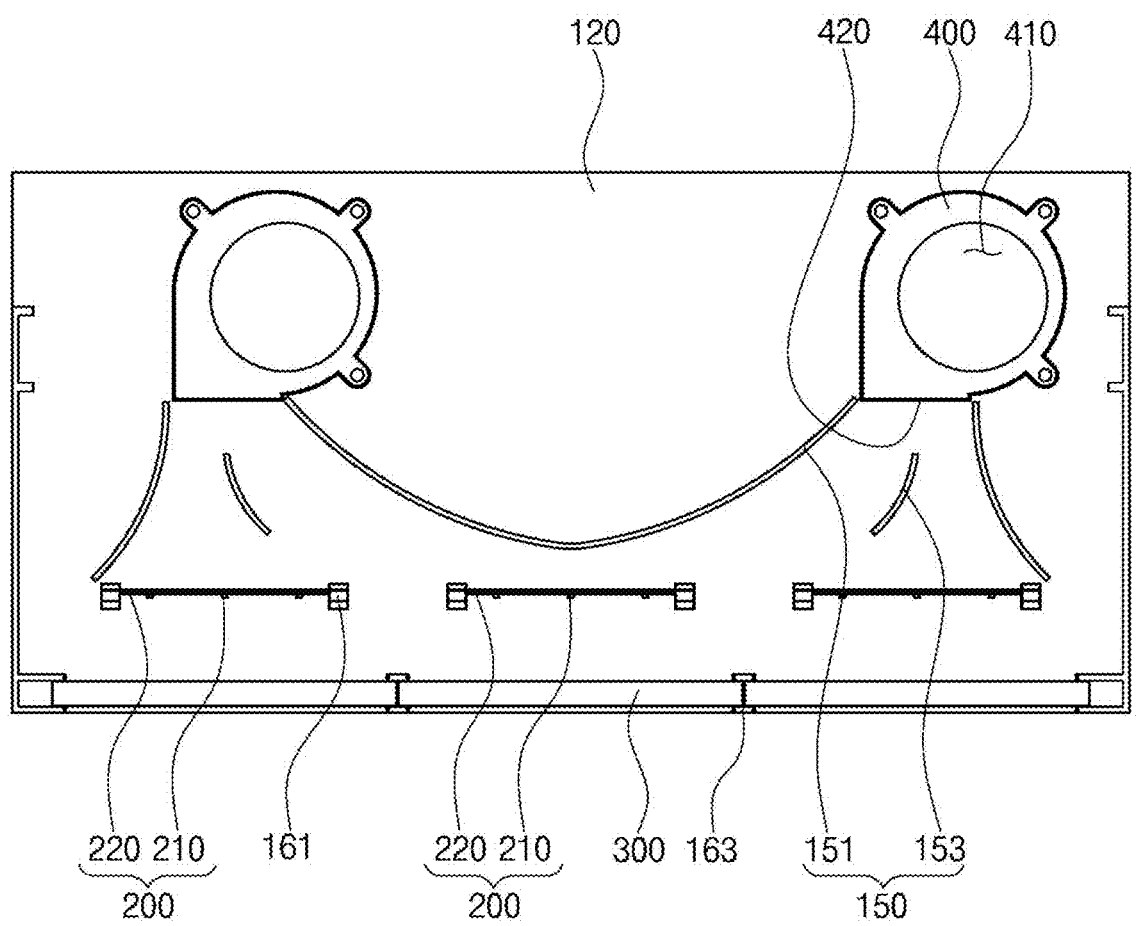
FIG. 11C is a plan view showing a structure of the air cleaning module used in FIG. 9 having three light source units.

1. acetaldehyde removal efficiency according to the number of light source units FIG. 10 is a graph showing the acetaldehyde removal efficiency over time when the air is treated using the air cleaning module having structures shown in FIGS. 11A to 11C. Table 1 (shown below) shows result values representing the acetaldehyde removal efficiency over time when the air is treated using the air cleaning module having the structures shown in FIGS. 11A to 11C.

Deodorization experiments in Table 1 and FIG. 10 were performed in a 1 m$^3$ chamber, and an initial content of acetaldehyde ($CH_3CHO$) in the chamber was about 10±1 ppm. A temperature in the chamber was maintained at about 23±5° C., and a relative humidity was about 55±15%. Three photocatalytic filters, each having a size of about 100 mm×15 mm×8 mm, were used.

TABLE 1

| Time | Acetaldehyde removal efficiency, % | | | | |
|---|---|---|---|---|---|
| (min) | 1) | 2) | 3) | 4) | 5) |
| 30 | 13.6 | 19.9 | 25.9 | 30.6 | 41.7 |
| 60 | 28.5 | 39.1 | 49.2 | 57.3 | 72.7 |
| 120 | 53.0 | 70.4 | 81.3 | 89.0 | 95.4 |
| 180 | 71.6 | 88.3 | 94.2 | 96.7 | 97.6 |

In Table 1, each condition is as follows.

1) one light source unit including three light emitting devices was used, and result values obtained by applying a current of about 400 mA to the light source unit were illustrated as a first graph 11 in FIG. 10.

2) two light source units each including three light emitting devices (six LEDs in total) were used, and result values obtained by applying a current of about 250 mA to the light source units were illustrated as a second graph 12 in FIG. 10.

3) two light source units each including three light emitting devices (six LEDs in total) were used, and result values obtained by applying a current of about 400 mA to the light source units were illustrated as a third graph 13 in FIG. 10.

4) three light source units each including three light emitting devices (nine LEDs in total) were used, and result values obtained by applying a current of about 250 mA to the light source units were illustrated as a fourth graph 14 in FIG. 10.

5) three light source units each including three light emitting devices (nine LEDs in total) were used, and result values obtained by applying a current of about 400 mA to the light source units were illustrated as a fifth graph 15 in FIG. 10.

In FIG. 10, a sixth graph 16 marked by "x" indicates a case in which the air cleaning module is not used.

2. acetaldehyde removal efficiency according to the guide

Figure 12:
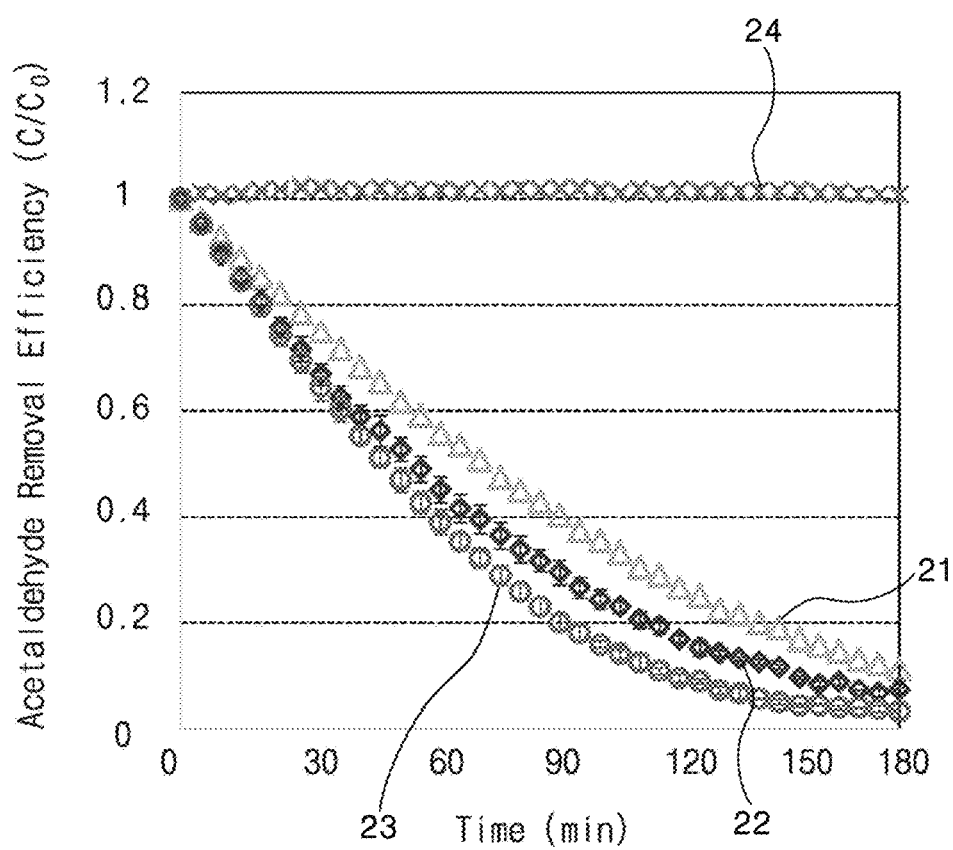
FIG. 12 is a graph showing a removal efficiency of acetaldehyde over time when the air is treated using the air cleaning module.
Figure 13A:
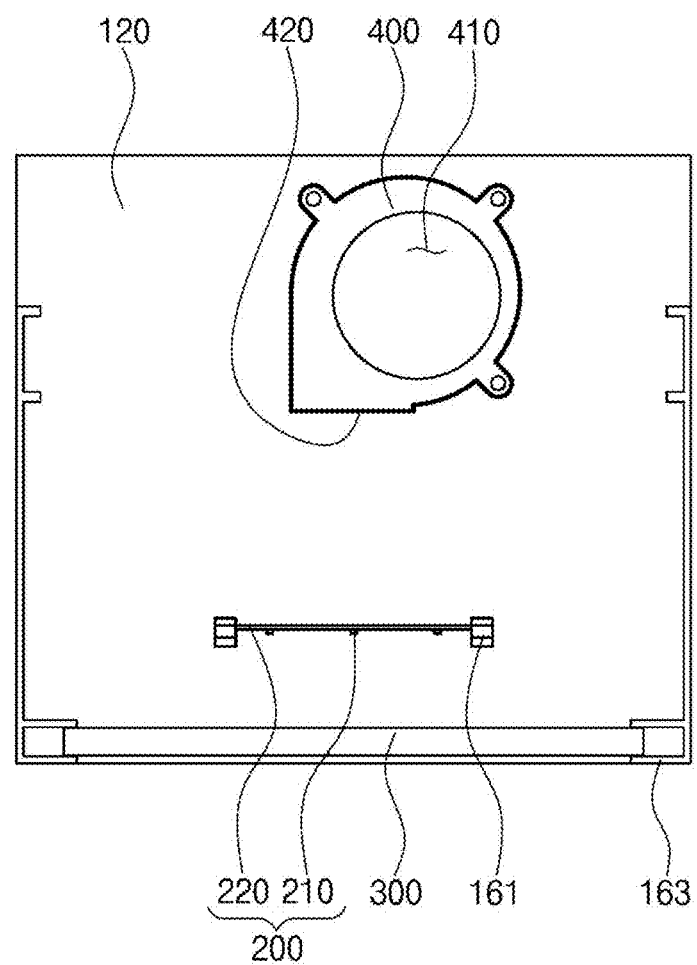
FIG. 13A is a plan view showing a structure of the air cleaning module used in FIG. 12.
Figure 13B:
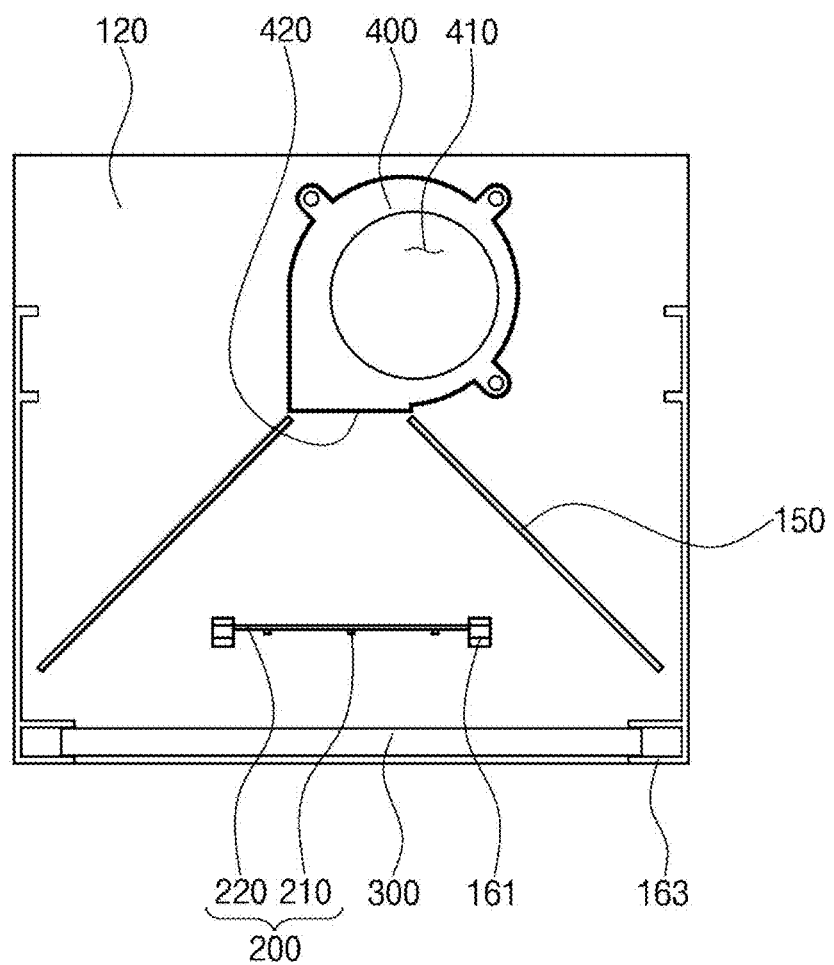
FIG. 13B is a plan view showing a structure of the air cleaning module used in FIG. 12 and different from FIG. 13A.
Figure 13C:
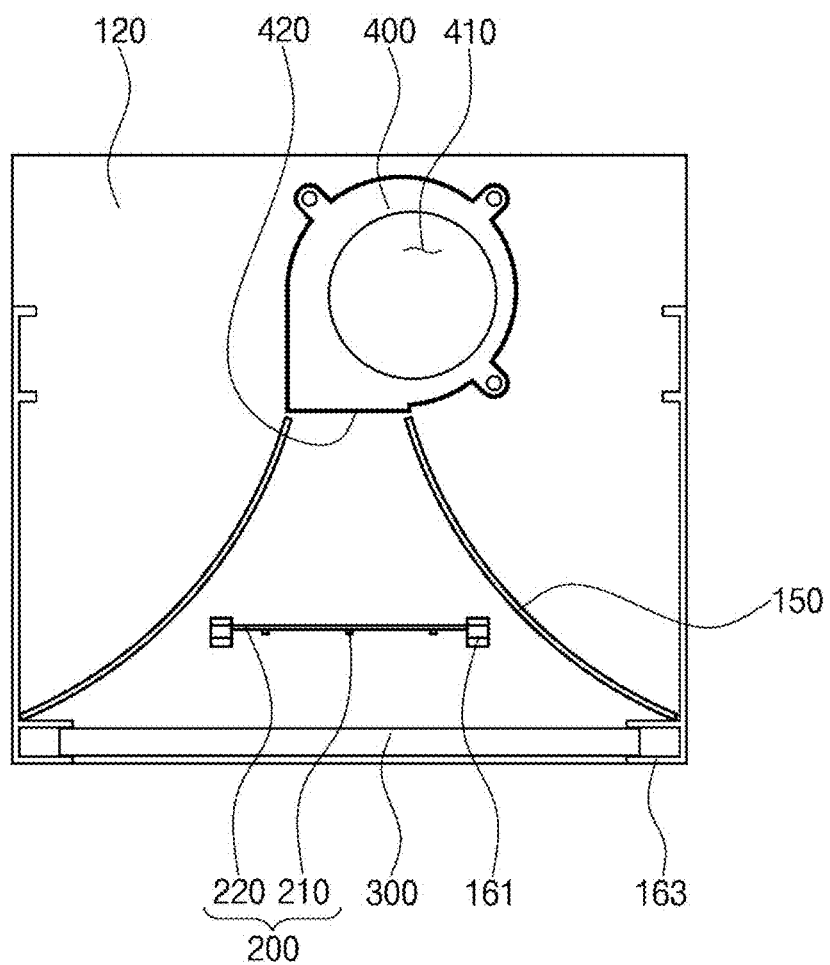
FIG. 13C is a plan view showing a structure of the air cleaning module used in FIG. 12 and different from FIG. 13B.

FIG. 12 is a graph showing the acetaldehyde removal efficiency over time when the air is treated using the air cleaning module having structures shown in FIGS. 13A to 13C. Table 2 (shown below) shows result values representing the acetaldehyde removal efficiency over time when the air is treated using the air cleaning module having the structures shown in FIGS. 13A to 13C.

Deodorization experiments in Table 2 and FIG. 12 were performed in a 1 m$^3$ chamber, and an initial content of acetaldehyde ($CH_3CHO$) in the chamber was about 10±1 ppm. A temperature in the chamber was maintained at about 23±5° C., and a relative humidity was about 55±15%. Three photocatalytic filters, each having a size of about 100 mm×15 mm×8 mm, were used. As the light source unit, three light source units each including three light emitting devices (nine LEDs in total) were used.

TABLE 2

| Time | Acetaldehyde removal efficiency, % | | |
|---|---|---|---|
| (min) | 1) | 2) | 3) |
| 30 | 21.6 | 28.4 | 30.6 |
| 60 | 40.9 | 51.1 | 57.3 |
| 120 | 71.7 | 80.7 | 89.0 |
| 180 | 88.7 | 92.6 | 96.7 |

In Table 2, each condition is as follows.

1) air cleaning module having the structure of FIG. 13A was used, and result values were illustrated as a first graph 21 in FIG. 12.

2) air cleaning module having the structure of FIG. 13B was used, and result values were illustrated as a second graph 22 in FIG. 12.

3) air cleaning module having the structure of FIG. 13C was used, and result values were illustrated as a third graph 23 in FIG. 12.

In FIG. 12, a fourth graph 24 marked by "x" indicates a case in which the air cleaning module is not used.

Referring to FIG. 12, in the case 1) in which the air cleaning module not including the guide was used, the acetaldehyde removal efficiency was about 21.6% after about 30 minutes has elapsed, and in the cases 2) and 3) each in which the air cleaning module including the guide was used, the acetaldehyde removal efficiency was about 28.4% and about 30.6% after about 30 minutes has elapsed. When compared with the case 1), the acetaldehyde removal efficiency was significantly improved by more than about 20% in the cases 2) and 3).

The acetaldehyde removal rate was increased with time in the cases 1) to 3). The acetaldehyde removal rate was higher in the case 2) than that in the case 1), and the acetaldehyde removal rate was significantly higher in the case 3) than that in the case 2). It was confirmed that the acetaldehyde removal rate was higher when the guide was mounted on the air cleaning module and the acetaldehyde removal rate was significantly higher when the guide was provided in the curved shape.

Figure 14:
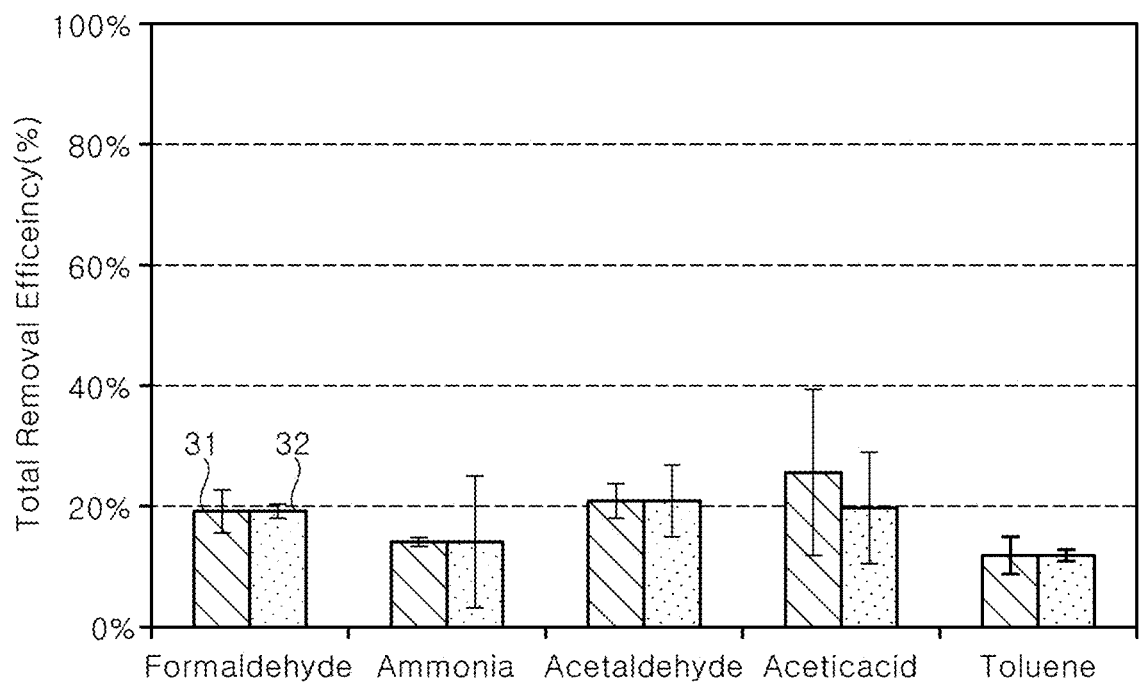
FIG. 14 is a graph showing a removal efficiency of various organic materials when the air is treated using the air cleaning module.
Figure 15A:
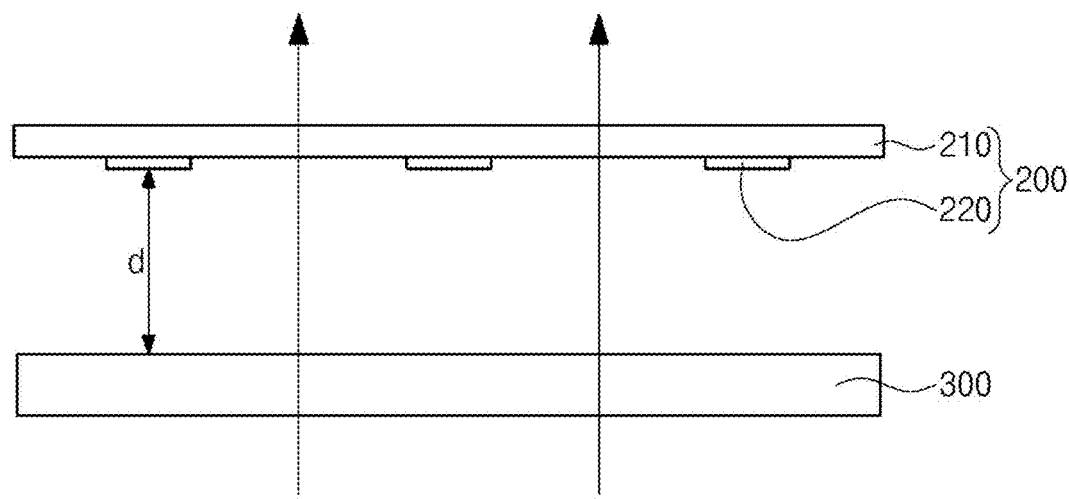
FIG. 15A is a plan view showing a portion of the air cleaning module used in FIG. 14 having an airflow direction indicated with arrow.
Figure 15B:
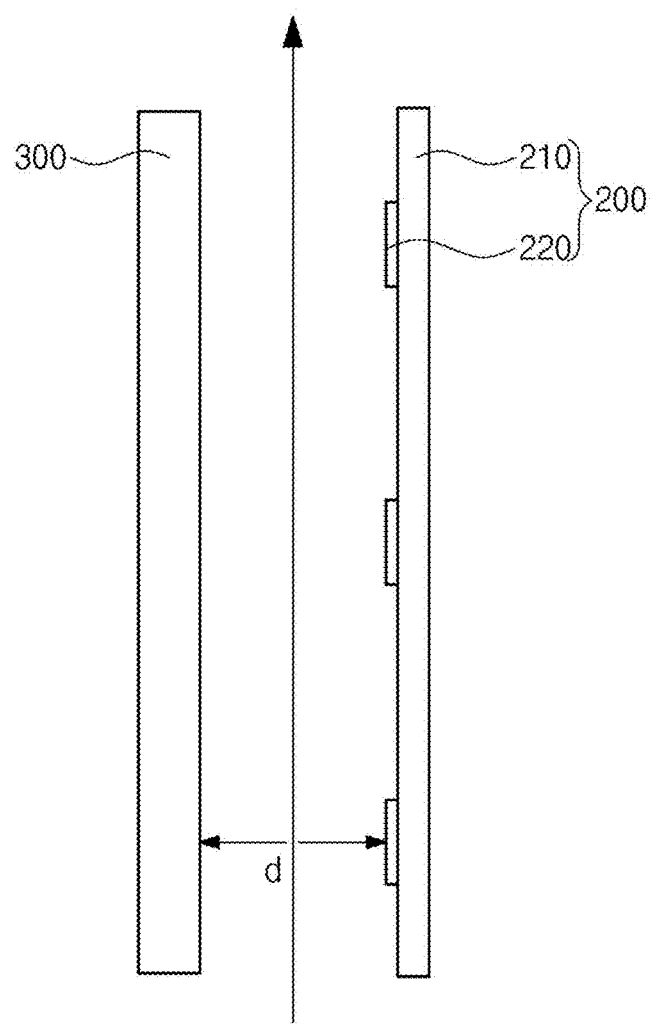
FIG. 15B is a plan view showing a portion of the air cleaning module used in FIG. 14 having a different airflow direction different from FIG. 15A.

3. organic material removal efficiency according to arrangement of the photocatalytic filter and the flow path FIG. 14 is a graph showing removal efficiency of various organic materials when the air is treated using the air cleaning module having structures shown in FIGS. 15A and 15B. Table 3 (shown below) shows result values representing the removal efficiency of each organic material.

Deodorization experiments in Table 3 and FIG. 14 were performed in a 4 m$^3$ chamber, and an initial content of organic material in the chamber was about 10±1 ppm. A temperature in the chamber was maintained at about 23±5° C., and a relative humidity was about 55±15%. Three photocatalytic filters, each having a size of about 100 mm×40 mm×8 mm, were used. As the light source unit, three light source units each emitting a light at a wavelength of about 365 nm were used, a current amount supplied to the light emitting device was about 300 mA, and an average emission amount was about 20.7 mW/cm².

TABLE 3

| | Formaldehyde | Ammonia | Acetaldehyde | Acetic acid | Toluene | Total removal efficiency (%) |
|---|---|---|---|---|---|---|
| 1) | 19.1 | 14.2 | 20.8 | 25.4 | 11.8 | 19.7 ± 3.4 |
| 2) | 19.1 | 14.2 | 20.8 | 19.7 | 11.8 | 18.3 ± 1.4 |

In Table 3, each condition is as follows.

1) air cleaning module having the structure of FIG. 15A was used, and an arrow indicates the airflow direction. A distance between the light source and the photocatalytic filter was 20 mm, and result values was illustrated as a first bar graph 31 in FIG. 14.

2) air cleaning module having the structure of FIG. 15B was used, and an arrow indicates the airflow direction. A distance between the light emitting device and the photocatalytic filter was 20 mm, and result values was illustrated as a second bar graph 32 in FIG. 14.

As seen in Table 3 and FIG. 14, there is no big difference in deodorization effect between the example in which the flow path is formed through the photocatalytic filter and the example in which the flow path passes to one side of the photocatalytic filter.

As described in the embodiments described above, an air cleaning module according to an exemplary embodiment of the present disclosure includes a filter, a fan, a light source unit, a housing and a guide structure. The fan is configured to provide a suction direction and a blowing direction of a fluid which are substantially aligned. The light source unit is arranged to be adjacent to the filter to emit a light toward the filter. The light having a property that sterilizes a contaminant source in a fluid. The housing includes a fluid passage space. The guide structure is arranged between the fan and the filter and configured to guide a fluid to move along a fluid passage path set by the guide structure. The filter and the light source unit are arranged in the fluid passage space such that the light source unit sterilizes a fluid as a fluid flows toward the light source unit.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. An air cleaning module comprising:
a filter configured to filter a fluid passing therethrough;
a fan configured to provide a suction direction and a blowing direction of a fluid
a light source unit arranged to be adjacent to the filter to emit a light toward the filter,
the light having a property that sterilizes a contaminant source in a fluid;
a housing including a fluid passage space, wherein the housing comprises a bottom, a ceiling facing the bottom, and a sidewall; and
a guide structure arranged between the fan and the filter and configured to guide a fluid to move along a fluid passage path set by the guide structure,
wherein the guide structure separates a first space from a second space, the first space including the fluid passage path and the second space including no fluid passage path,
wherein the light source unit comprises:
a substrate ; and
at least one light emitting device mounted on a front surface of the substrate to emit the light, and
wherein the filter and the light source unit are arranged in the fluid passage space such that the light source unit sterilizes a fluid as a fluid flows toward the light source unit further comprising a sensor provided on the inner space of the housing to sense a material in the fluid;
wherein the sensor is disposed in the second space.

2. The air cleaning module of claim 1, wherein the guide structure further comprises a main guide provided between the fan and the light source unit.

3. The air cleaning module of claim 2, wherein the guide structure further comprises a sub-guide provided behind the substrate of the light source unit.

4. The air cleaning module of claim 1, wherein the filter is a photocatalytic filter, and the light source unit provides the light to the photocatalytic filter to react with the photocatalytic filter.

5. The air cleaning module of claim 1, further comprising a HEPA filter, and the light source unit provides a light at a sterilization wavelength to the HEPA filter.

6. The air cleaning module of claim 1, wherein the housing further comprises a light source fixing part protruded from inner surface of the housing to secure the light source unit.

7. The air cleaning module of claim 6, wherein the light source fixing part secures the light source unit to set a height of the light emitting device to correspond to a height of a center of the filter.

8. A home appliance comprising the air cleaning module of claim 1.

9. The home appliance of claim 8, wherein a housing of the home appliance comprises the housing of the air cleaning module, instead of adopting a separate housing.

10. An air cleaning module comprising:
a filter configured to filter a fluid passing therethrough;
a fan configured to provide a suction direction and a blowing direction of a fluid, wherein the suction direction and the blowing direction are substantially identical;
a light source unit provided between the fan and the filter to provide a light having a wavelength to sterilize a contaminant source in the fluid;
a housing providing a fluid flow space, wherein the housing comprises a bottom, a ceiling facing the bottom, and a sidewall; and
a guide unit configured to guide a fluid to move along one or more fluid flow paths set by the guide unit,
wherein the guide unit comprises a main guide that separates a first space from a second space, the first space including the fluid flow path formed and the second space including no fluid flow path; and
a sensor provided on an inner space of the housing to sense a material in the fluid and disposed in the second space;

wherein the light source unit comprises:
   a substrate; and
      at least one light emitting device mounted on a front surface of the substrate to emit the light,
      wherein the at least one light emitting device includes a first conductive type semiconductor layer, an active layer and a second conductive type semiconductor layer, and wherein the active layer generates the light
   wherein the guide unit further comprises a plurality sub-guides, and one or more fluid flow paths are guided to the light source via the plurality sub-guides.

11. The air cleaning module of claim 10, wherein the housing further comprises a light source fixing part protruded from an inner surface of the housing to secure the light source unit.

12. The air cleaning module of claimer 11, wherein the light source fixing part secures the light source unit to set a height of the light emitting device to correspond to a height of a center of the filter.

13. The air cleaning module of claim 10, wherein the filter is a photocatalytic filter, and the light source unit provides the light to the photocatalytic filter to react with the photocatalytic filter.

14. The air cleaning module of claim 10, further comprising a HEPA filter, and the light source unit provides a light at a sterilization wavelength to the HEPA filter.

15. The air cleaning module of claim 13, further comprising a HEPA filter, and the light source unit provides a light at a sterilization wavelength to the HEPA filter.

16. The air cleaning module of claim 10, wherein one or more fluid flow paths are divided while flowing along the plurality of sub-guides.

17. A home appliance comprising the air cleaning module of claim 10.

18. The home appliance of claim 17, wherein a housing of the home appliance comprises the housing of the air cleaning module, instead of adopting a separate housing.

* * * * *